US011951576B2

(12) United States Patent
Knospler et al.

(10) Patent No.: US 11,951,576 B2
(45) Date of Patent: Apr. 9, 2024

(54) AUTOMATED SYSTEM FOR ASSEMBLING FRAMED ARTICLES

(71) Applicant: Tracer Imaging LLC, Ossining, NY (US)

(72) Inventors: Daniel Knospler, Wantage, NJ (US); Steven M. Spiro, Chappaqua, NY (US); Ryan Kelly, Astoria, NY (US)

(73) Assignee: TRACER IMAGING LLC, Ossining, NY (US)

( * ) Notice: Subject to any disclaimer, the term of this patent is extended or adjusted under 35 U.S.C. 154(b) by 0 days.

(21) Appl. No.: 18/095,330

(22) Filed: Jan. 10, 2023

(65) Prior Publication Data
US 2023/0219180 A1    Jul. 13, 2023

Related U.S. Application Data

(60) Provisional application No. 63/298,550, filed on Jan. 11, 2022.

(51) Int. Cl.
*B23P 19/027*    (2006.01)
*A47G 1/06*    (2006.01)

(52) U.S. Cl.
CPC .......... *B23P 19/027* (2013.01); *A47G 1/0605* (2013.01)

(58) Field of Classification Search
CPC ................ B23P 19/027; A47G 1/0605; A47G 2001/0661; A47G 2001/0677; F16M 1/00; B44D 3/185
See application file for complete search history.

(56) References Cited

U.S. PATENT DOCUMENTS

| 5,007,188 A | 4/1991 | Feist |
| 2017/0151772 A1 | 6/2017 | Spiro et al. |
| 2020/0397160 A1 | 12/2020 | Spiro et al. |

FOREIGN PATENT DOCUMENTS

CN    103407320    11/2013

OTHER PUBLICATIONS

International Search Report and Written Opinion in PCT Application No. PCT/US23/10489, dated Apr. 14, 2023 (9 pages).

*Primary Examiner* — Lee A Holly
(74) *Attorney, Agent, or Firm* — Leason Ellis LLP

(57) ABSTRACT

An automated system for assembling a framed article including a plurality of canvases and a plurality of assembled frames to be combined with the plurality of canvases to form the framed articles. Each assembled frame is formed of a rear panel and a frame member that are detachably attached to one another with one canvas being stretched across a front face of the frame member. The automated system includes an assembly station including a movable presser head that is configured to detach and lift the rear panel from the frame member and a plurality of movable side guide fingers that are configured to fold side edges of the canvas over sides of the frame member to permit the presser head to press the rear panel down over the folded side edges of the canvas into engagement with the frame member with the canvas being captured between the frame member and the rear panel.

27 Claims, 21 Drawing Sheets

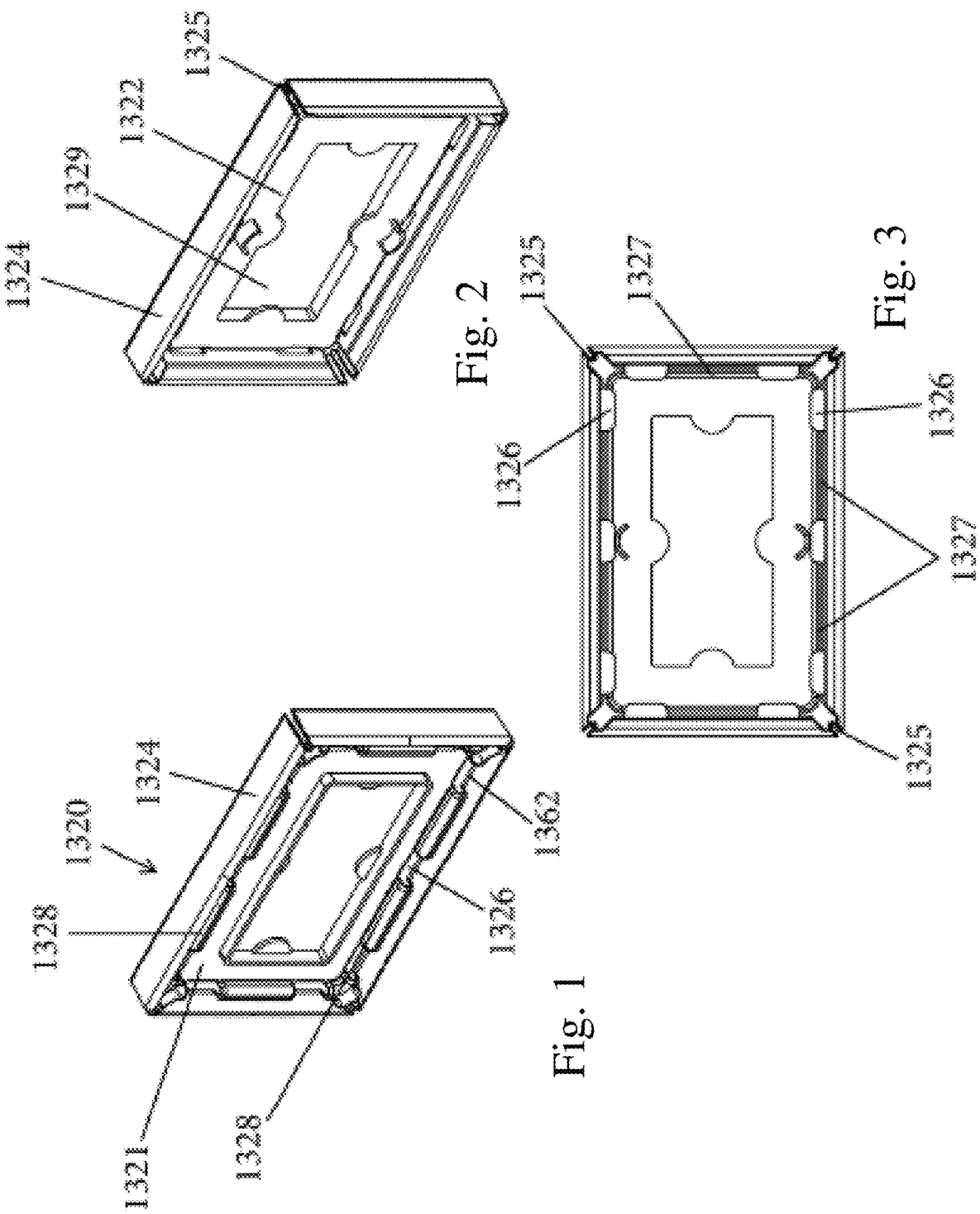

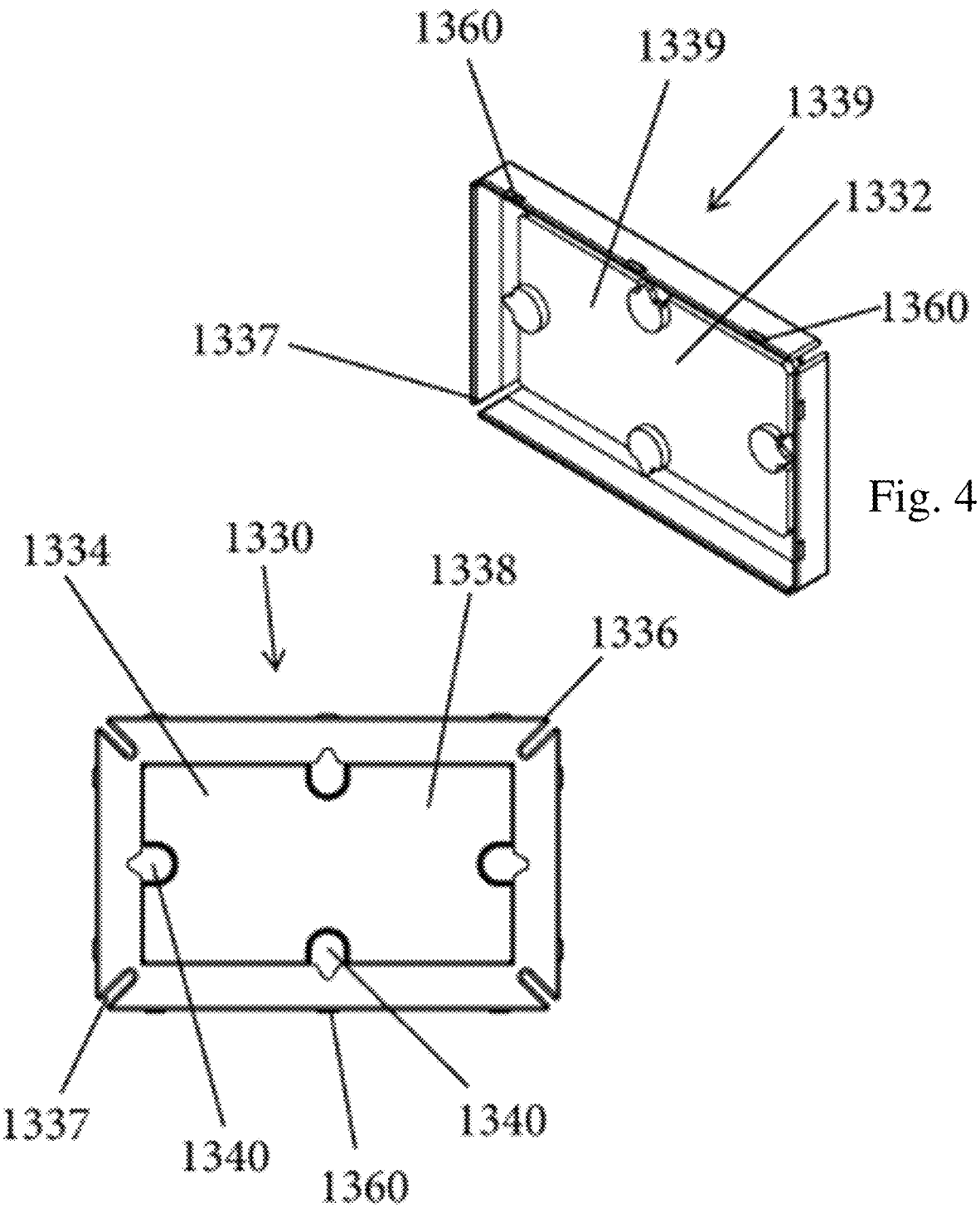

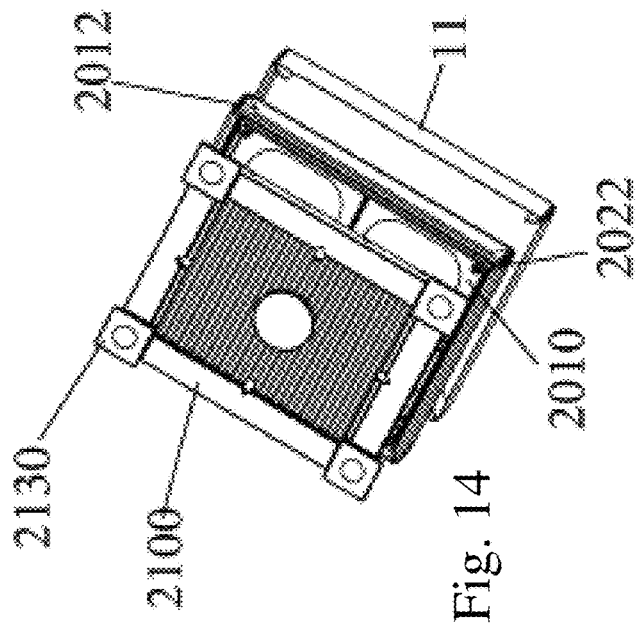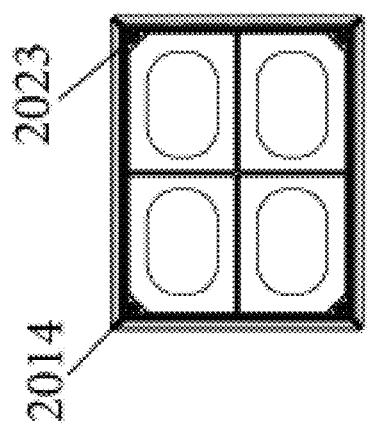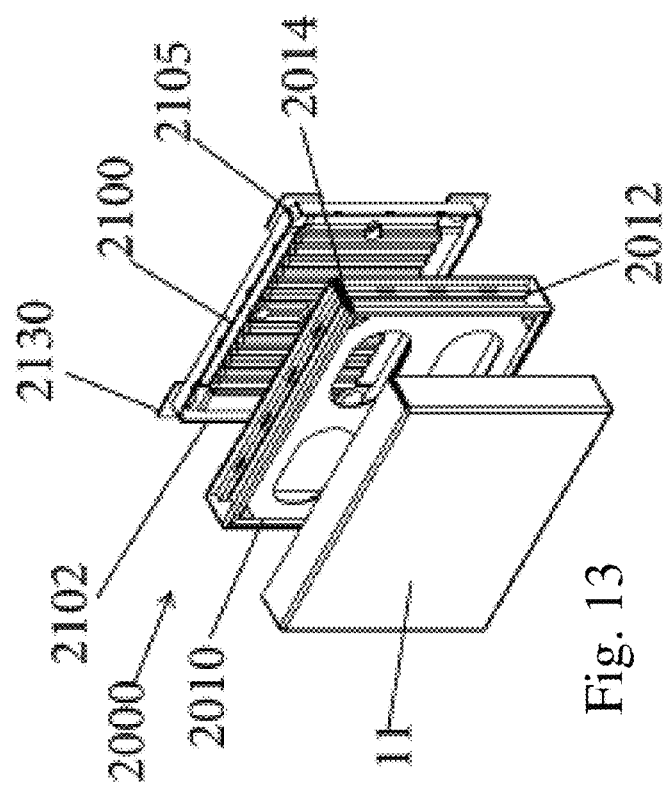

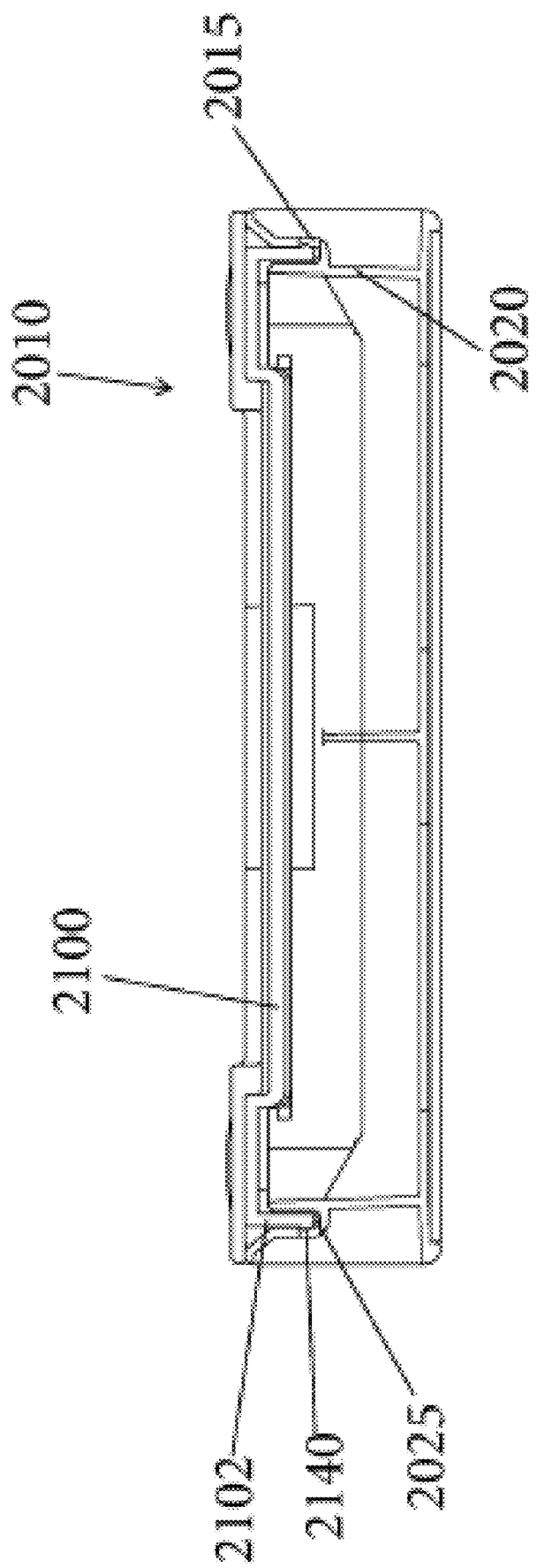

AUTOMATED SYSTEM FOR ASSEMBLING FRAMED ARTICLES

CROSS REFERENCE TO RELATED APPLICATION

The present application claims priority to and the benefit of U.S. patent application Ser. No. 63/298,550, filed on Jan. 11, 2022, which is hereby expressly incorporated by reference in its entirety.

TECHNICAL FIELD

The present application is directed to the field of frames and more particularly to a frame that is assembled by way of a snap-fit with a substrate, such as a canvas, being captured within and between two parts of the frame that are snap-fit together.

BACKGROUND

There are many ways to display photographs and art with one of the most common techniques being the use of a frame. There are many types of frames but in general, the frames include a rear frame structure that in the case of a photo frame receives the photo and then a front frame structure which in the case of a photo frame is typically a transparent plate, such as a glass plate or acrylic plate.

For displaying art, such as a canvas painting, many different techniques are available including the use of a stretcher frame or a frame and mat arrangement. Recently, canvas prints (a photograph printed on a canvas) have become increasingly popular. Canvas prints are available from a number of retail location including pharmacies, etc. Besides printing the photo on canvas, the printed canvas is then assembled by securing the canvas to the frame. This process can be challenging and require the use of special tools, etc.

There is therefore a need for a simpler frame construction and assembly technique to allow the canvas prints to be assembled more easily and quicker.

SUMMARY

An automated system for assembling a framed article including a plurality of canvases and a plurality of assembled frames to be combined with the plurality of canvases to form the framed articles. Each assembled frame is formed of a rear panel and a frame member that are detachably attached to one another with one canvas being stretched across a front face of the frame member. The automated system includes an assembly station including a movable presser head that is configured to detach and lift the rear panel from the frame member and a plurality of movable side guide fingers that are configured to fold side edges of the canvas over sides of the frame member to permit the presser head to press the rear panel down over the folded side edges of the canvas into engagement with the frame member with the canvas being captured between the frame member and the rear panel.

BRIEF DESCRIPTION OF THE DRAWING FIGURES

The present invention may be appreciated by reference to the following descriptions and drawings, in which:

FIG. 1 is a front perspective view of a frame member of a display unit;

FIG. 2 is a rear perspective view thereof;

FIG. 3 is a rear elevation view thereof;

FIG. 4 is a front perspective view of a rear panel of the display unit;

FIG. 5 is a rear elevation view thereof;

FIG. 13 is an exploded perspective view of a framed canvas product according to another embodiment;

FIG. 14 is an exploded perspective view of the framed canvas product; and

FIG. 15 is a rear view of a frame base;

FIG. 16 is a cross-sectional view of the framed canvas product;

DETAILED DESCRIPTION OF CERTAIN EMBODIMENTS

Figures 6, 7:
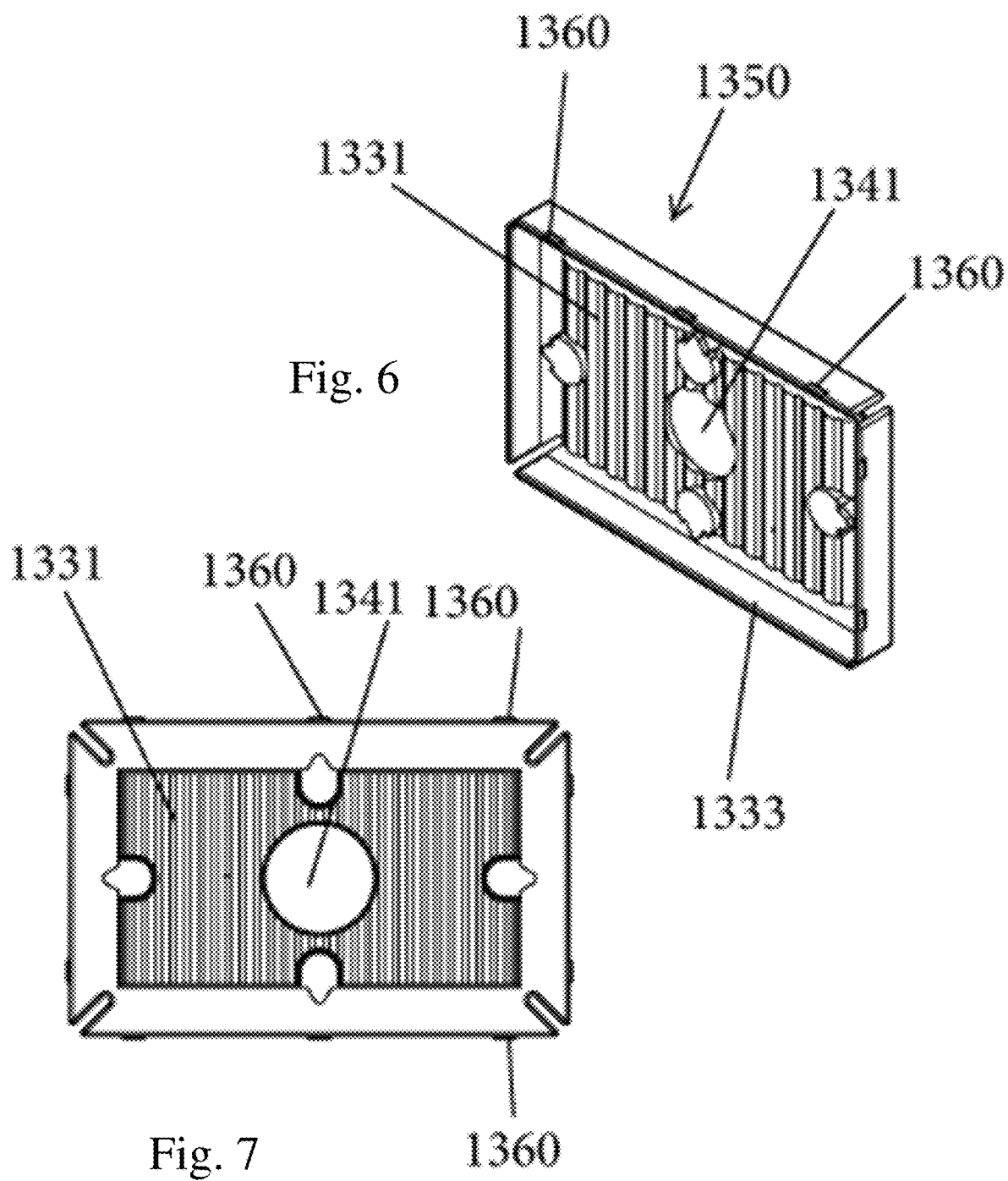
FIG. 6 is a front perspective view of another rear panel of the display unit.
FIG. 7 is a rear elevation view thereof.
Figure 8:
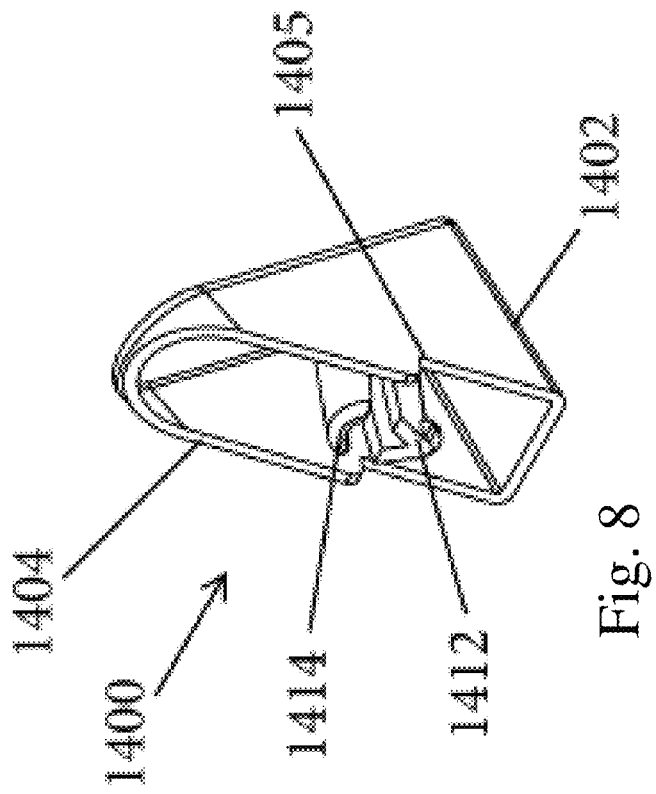
FIG. 8 is a rear and side perspective view of a stand for use with the display unit.
Figure 9:
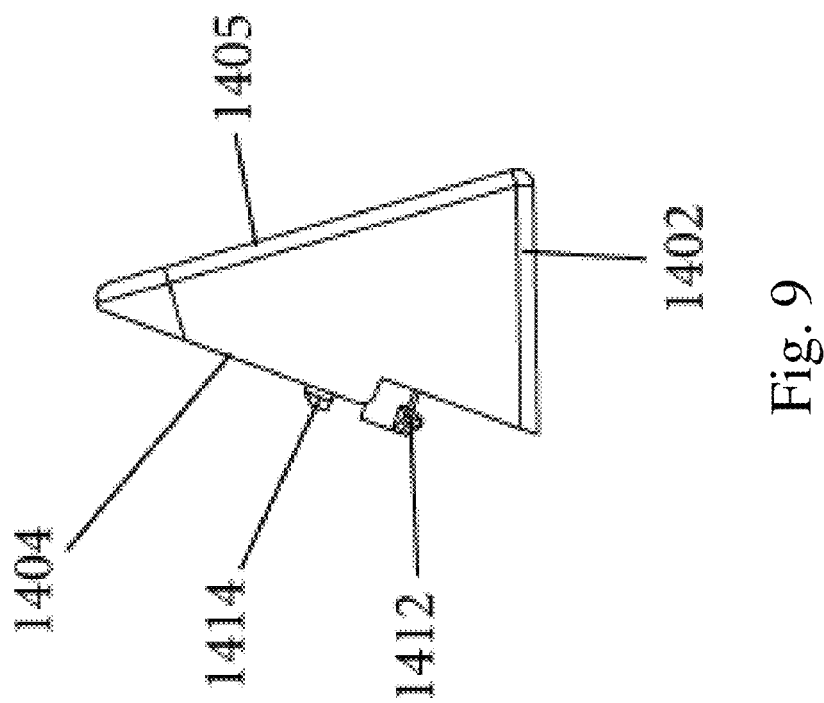
FIG. 9 is a side elevation view thereof.
Figure 10:
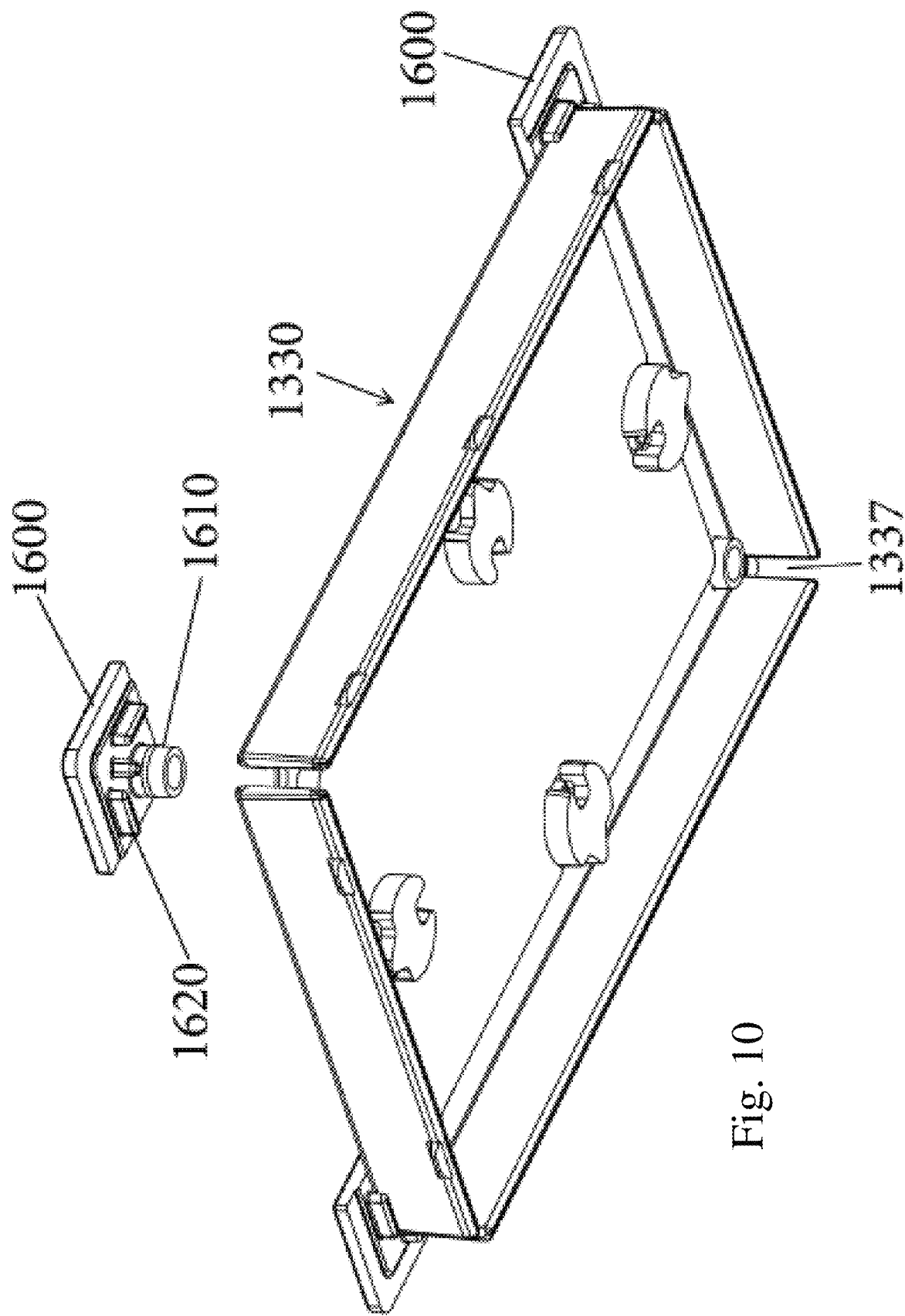
FIG. 10 is perspective view of the rear panel with corner caps.
Figure 11:
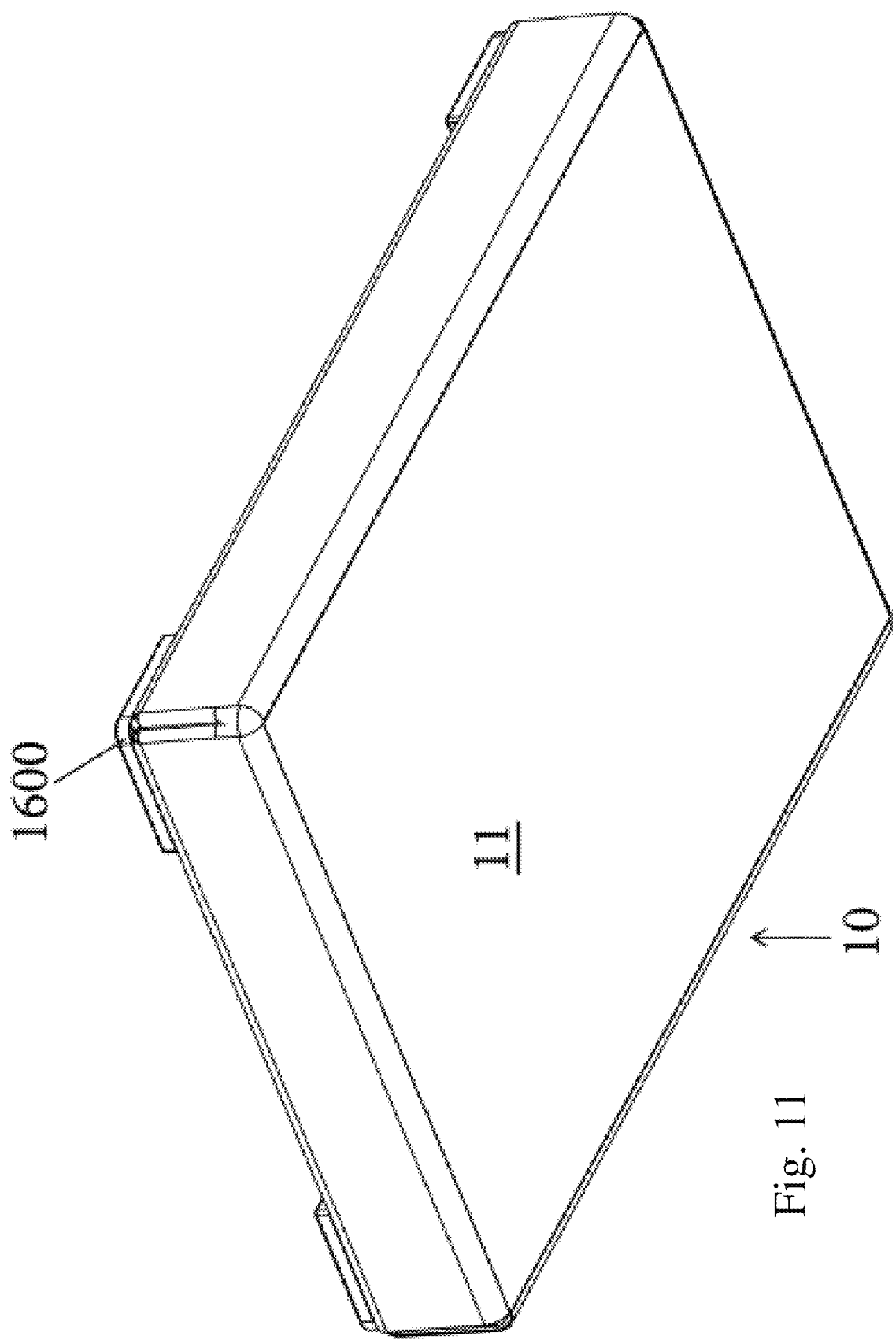
FIG. 11 is a front and side perspective view of an assembled frame.
Figure 12:
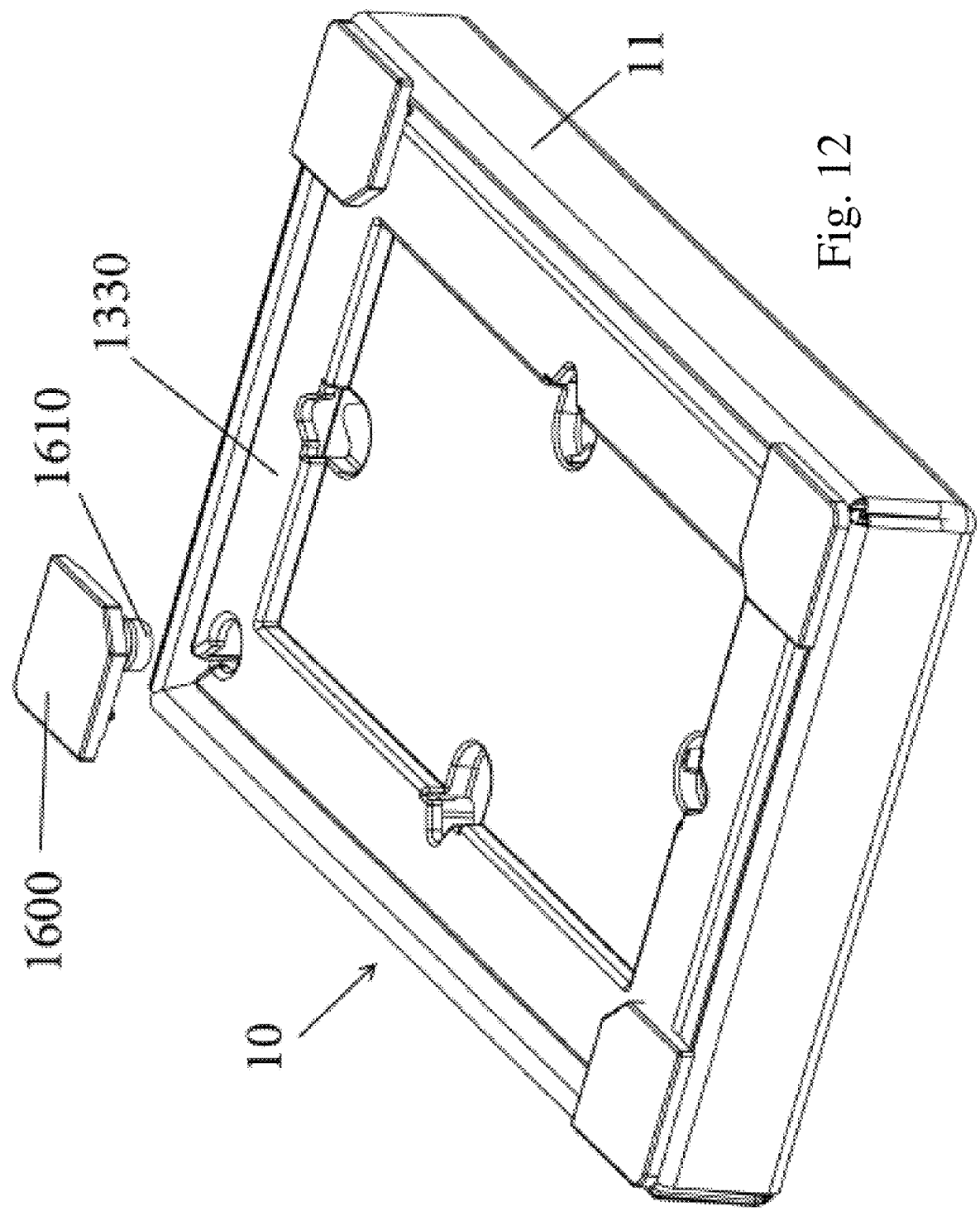
FIG. 12 is a rear and side perspective view of the assembled frame with corner caps.
Figure 17:
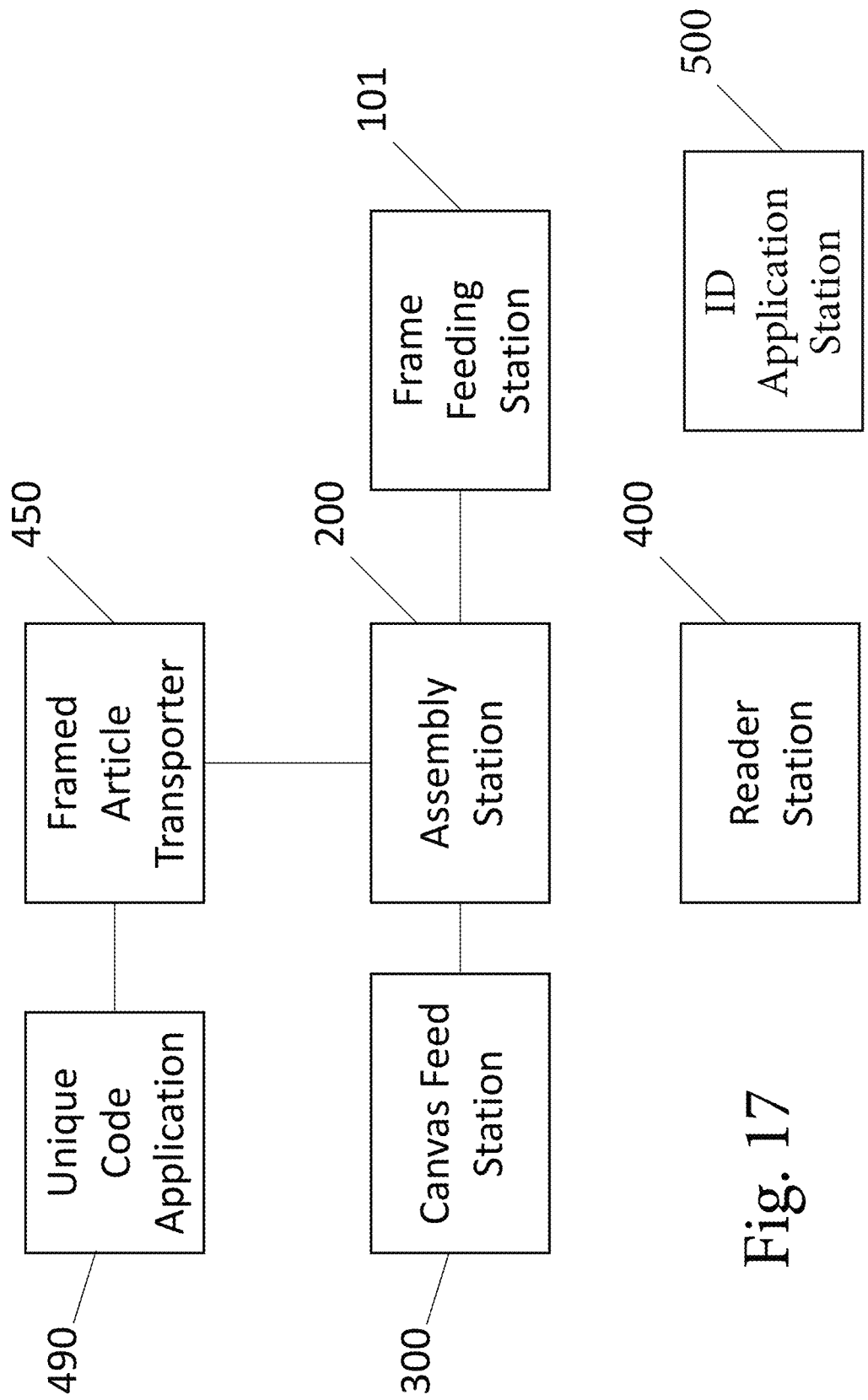
FIG. 17 is a schematic of a framed canvas print and automated equipment that is used to assemble the display unit according to one embodiment.
Figure 18:
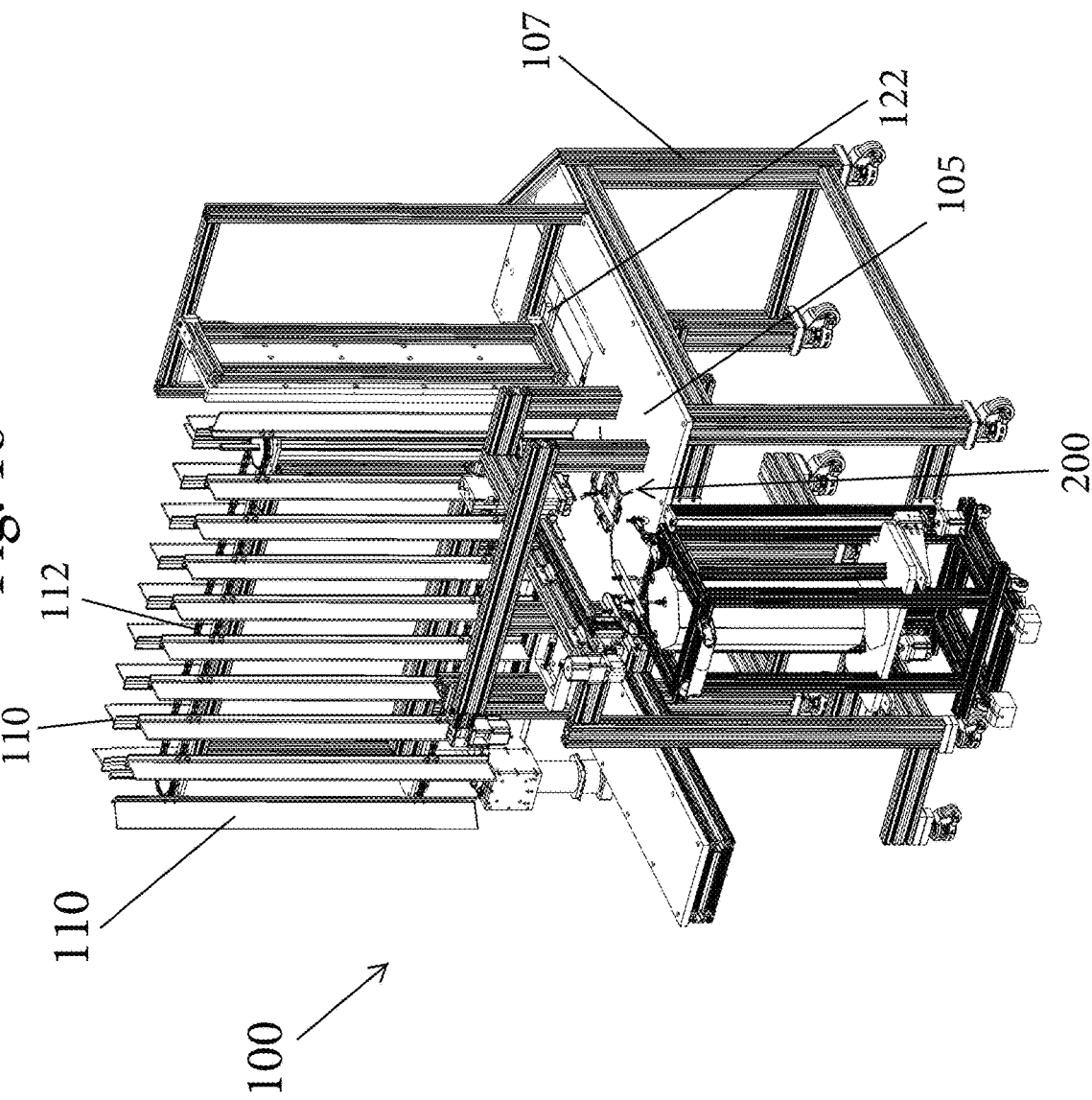
FIG. 18 is a side perspective view of the automated equipment.
Figure 19:
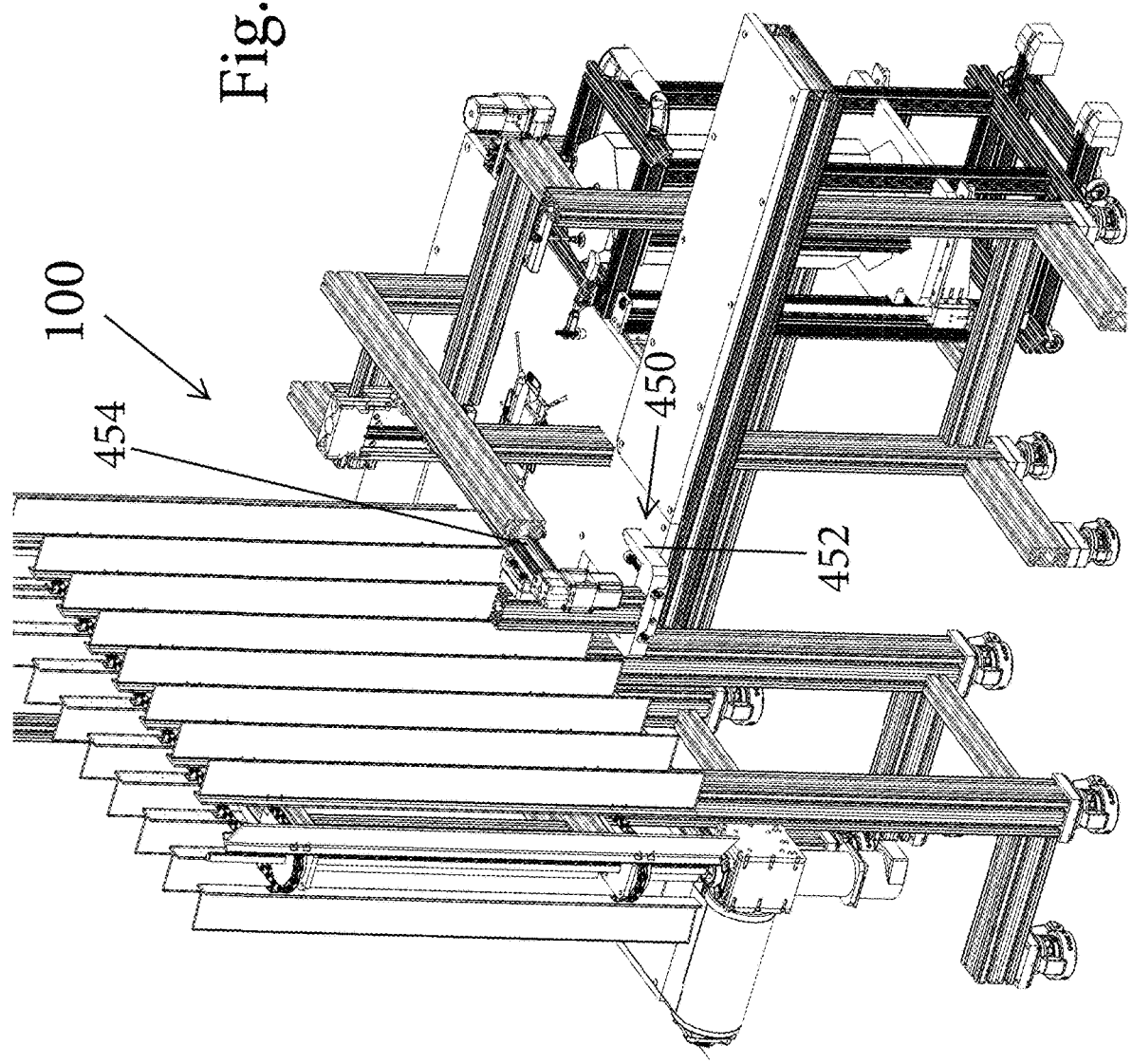
FIG. 19 is another side perspective view of the automated equipment.
Figure 20:
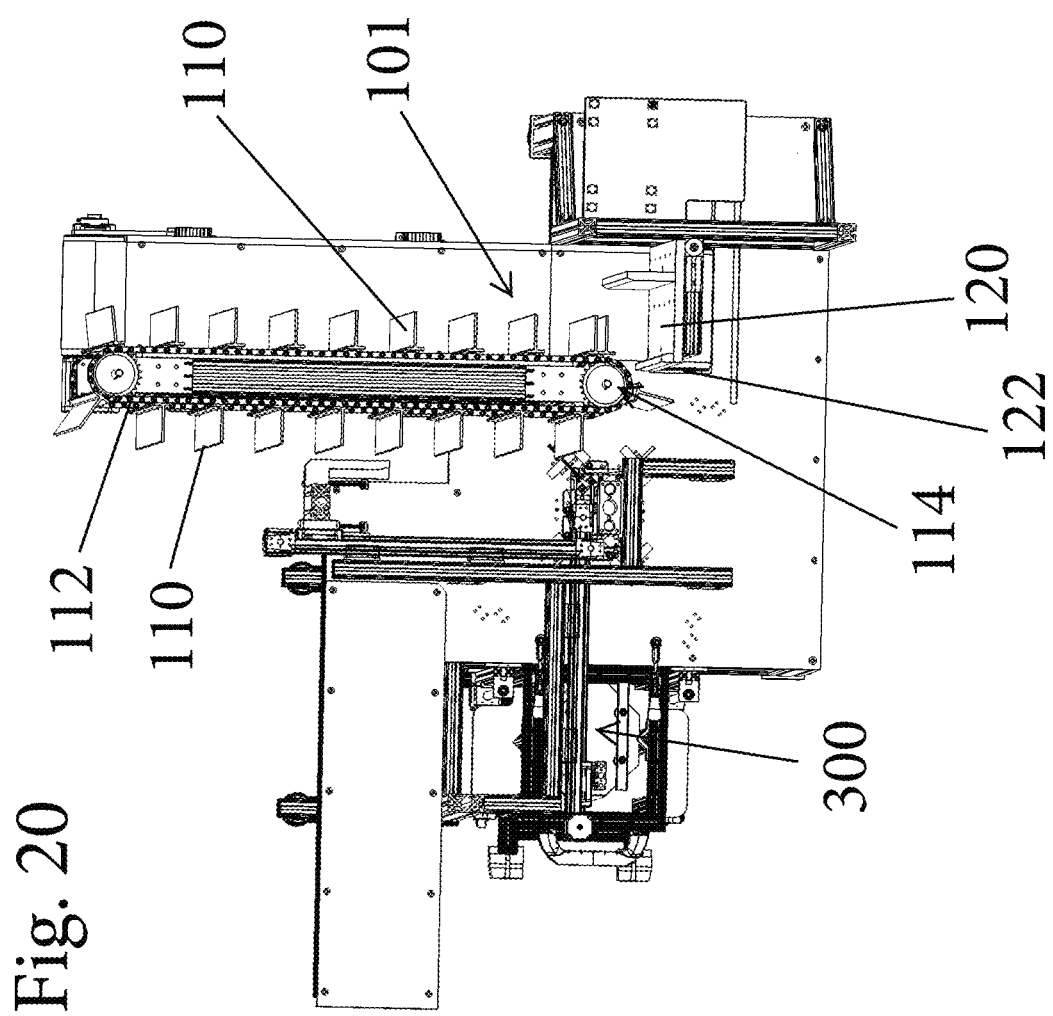
FIG. 20 is a top plan view of the automated equipment.
Figure 21:
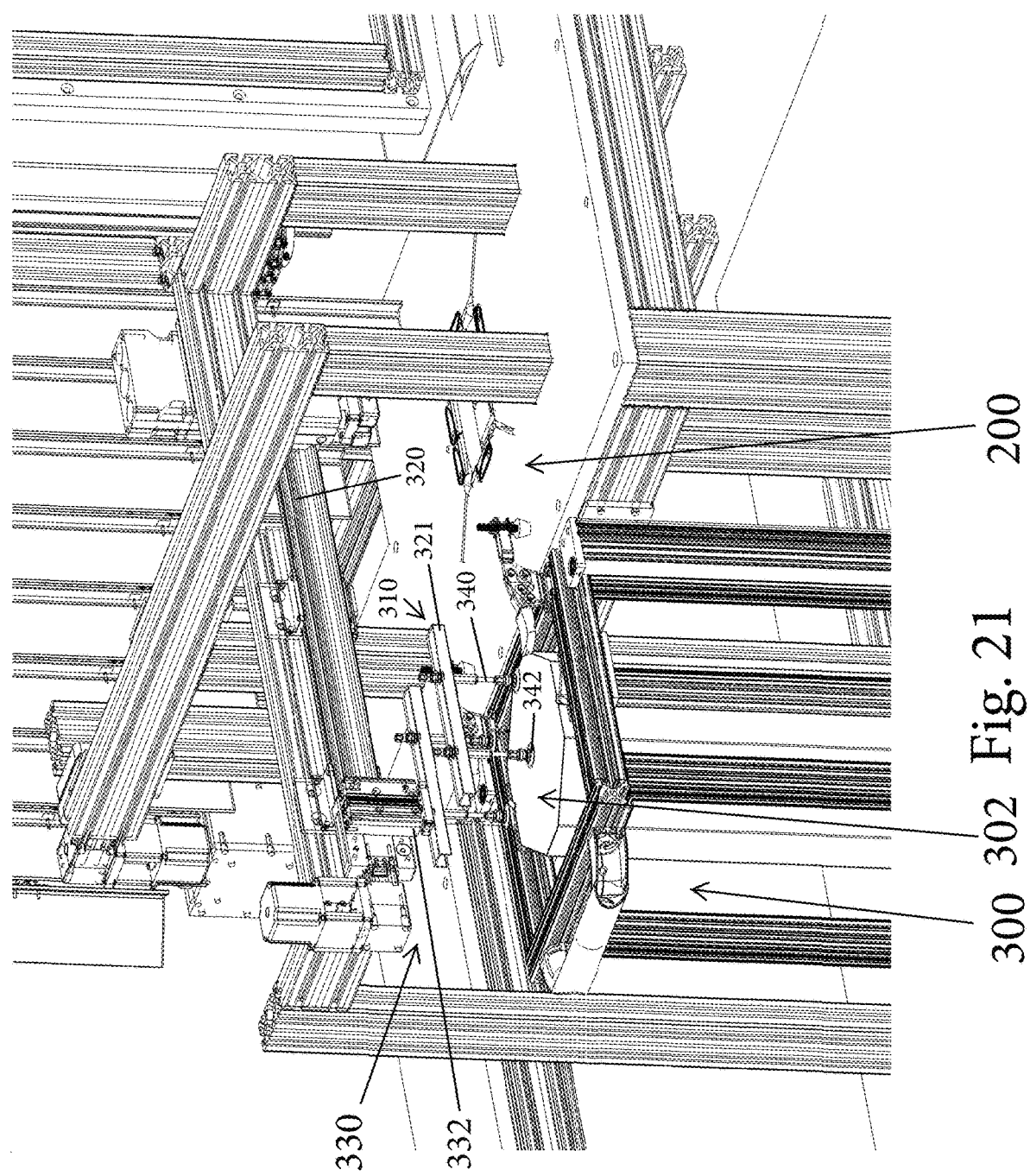
FIG. 21 is a close-up perspective view of a canvas feed station.
Figure 22:
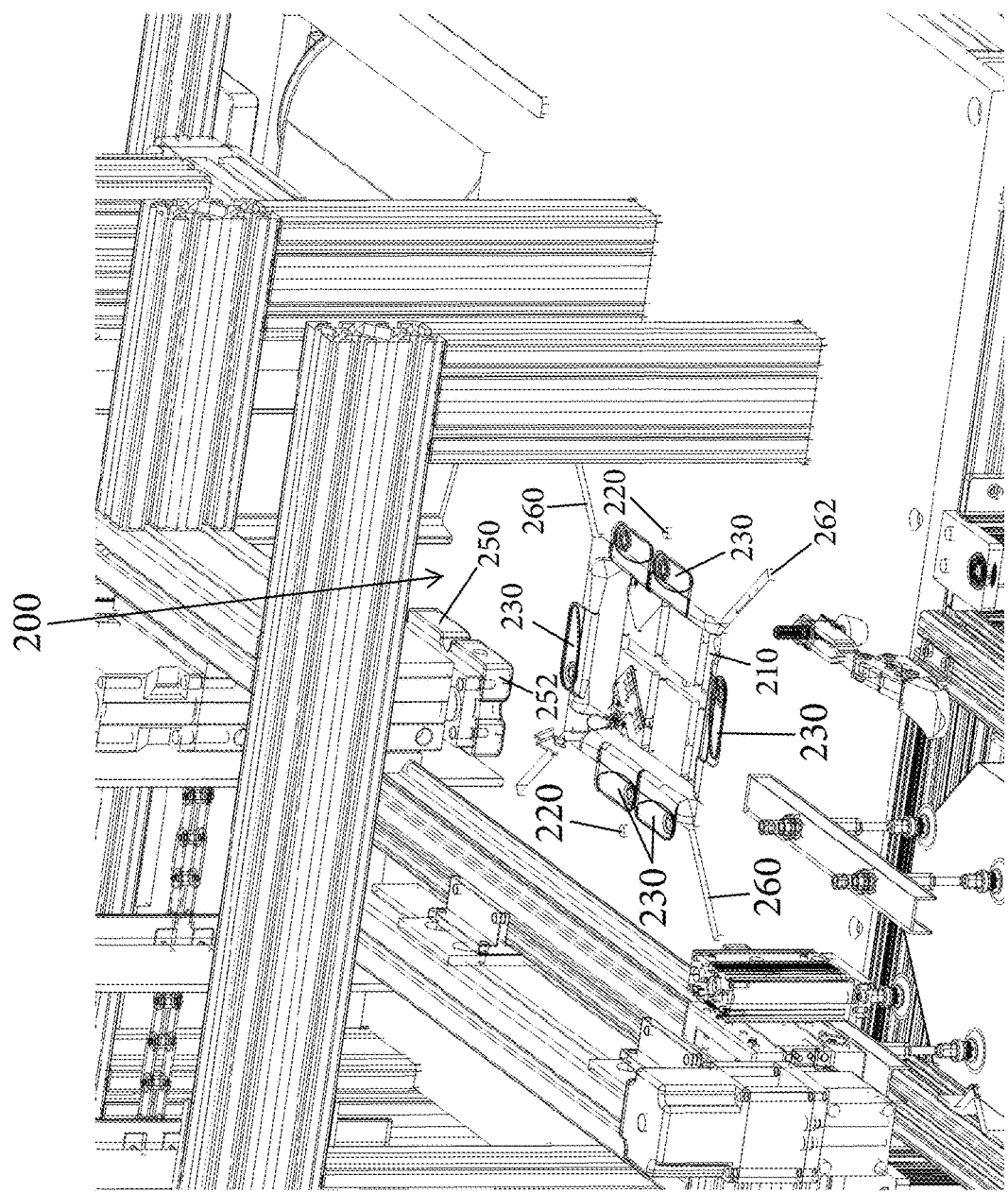
FIG. 22 is a perspective view of an assembly station.
Figure 23:
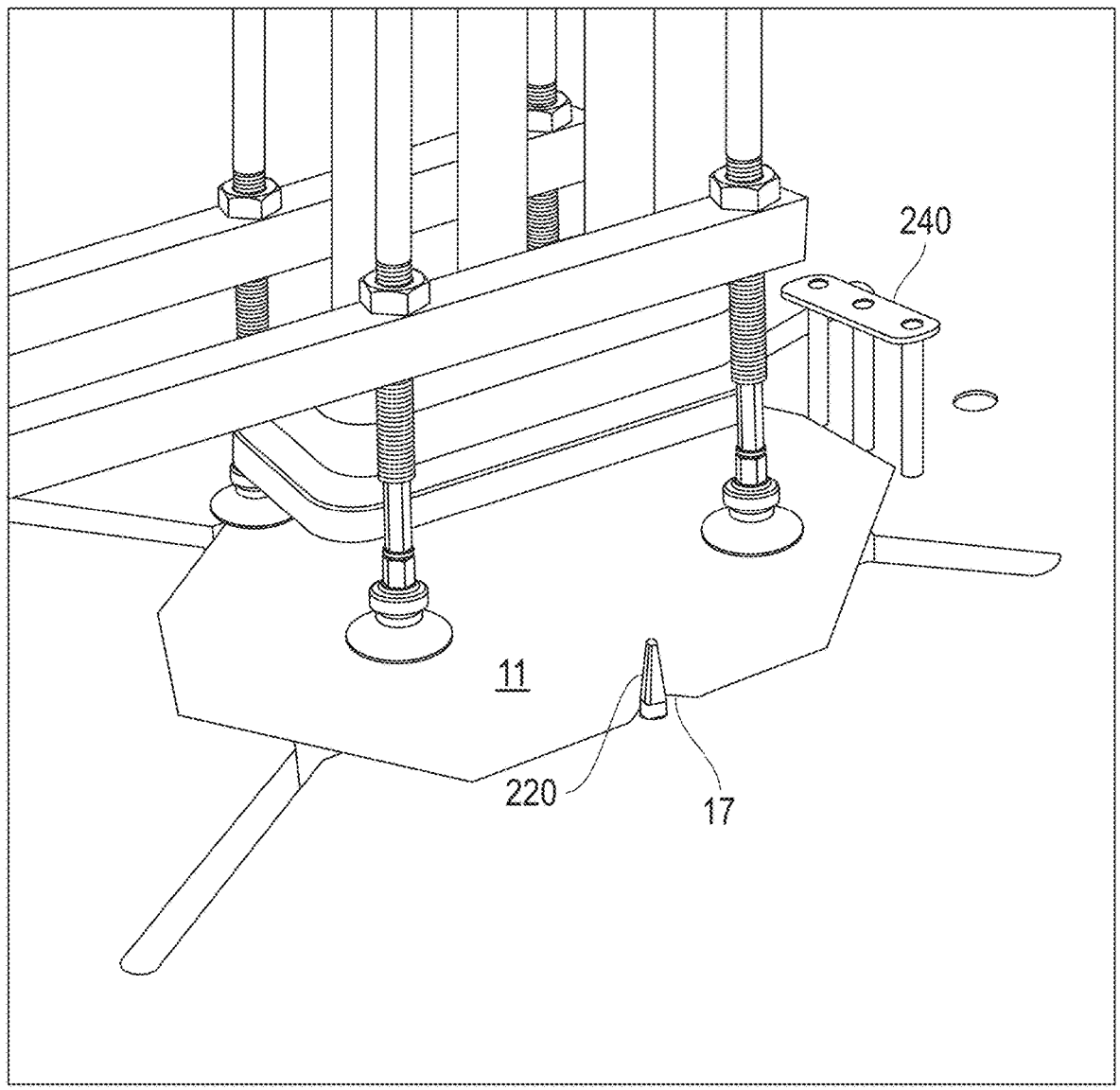
FIG. 23 is a perspective view of the assembly station showing a delivered canvas.
Figure 24:
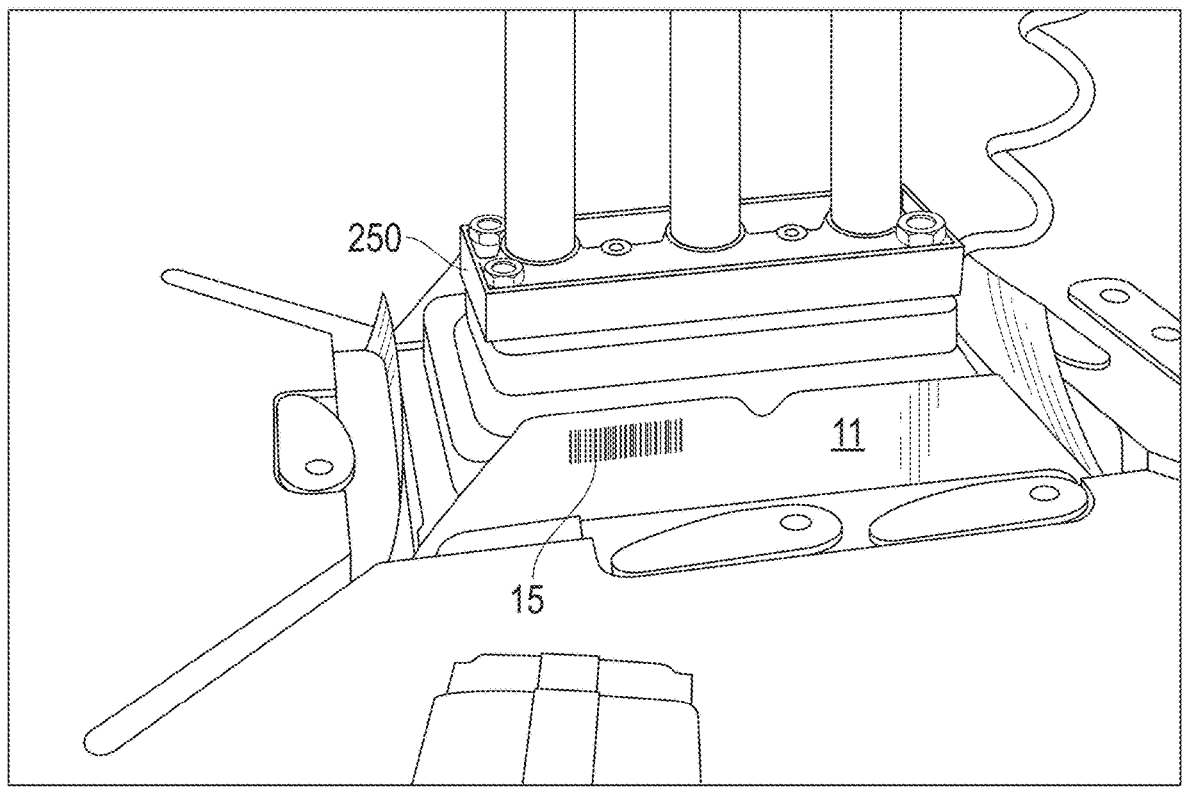
FIG. 24 is perspective view of the assembly station showing a presser head pushing the assembled frame member down over the canvas.

As discussed herein, the present invention is directed to a display unit (framed product, such as a canvas print) which can be in the form of a framed canvas print and automated equipment that is used to assemble the display unit.

Display Unit (Assembled Framed Canvas Print)

FIGS. 1-16 illustrate exemplary completed display units or complete framed articles. Additional details concerning these exemplary framed articles are found in U.S. patent application Ser. No. 16/902,746, filed Jun. 16, 2020, which is hereby expressly incorporated by reference in its entirety. The figure reference characters set forth in FIGS. 1-16 are described in the '746 application.

In accordance with one embodiment, the present invention is directed to a modular display unit 10 (FIGS. 11 and 12) for displaying an image, such as a printed canvas substrate 11. The display unit 10 can be considered to be an assembled frame product and is formed of two parts that are constructed to interlockingly engage one another to capture and retain the canvas substrate 11 between the two parts with the canvas substrate 11 stretched over the outside of one of the parts. In the illustrated embodiment, one part comprises a frame member, shown at 1320 (FIG. 1), and the other part comprises a rear panel, shown at 1330 (FIG. 5). In the illustrated embodiment, the two parts interlock via a mechanical connection, such as a reversible snap-fit. The canvas substrate 11 is held taught (stretched) over the frame member (frame base) 1320.

Automated Equipment for Assembling Display Unit/Framed Article

The automated equipment of the present invention has been configured to be easy to use and is configured to effectuate assembly of the display unit in an effective automated manner so as to allow complete assembly in a very short amount of time and allow successive assembly of units so that over a course of a select period of time many assembled display units can be produced.

FIGS. 17-28 illustrate one exemplary automated system 100 for the assembly and production of the assembled display units of the various embodiments described herein. As illustrated, the system 100 can be a standalone unit that is positioned along a support surface, such as a floor or table, etc. As described in detail below, the system 100 includes a number of stations at which one or more operations are performed. One or more pieces of equipment are located at each station.

In general, the system 100 is designed such that the unadorned display units prior to assembly (frames 13 without canvas) are selectively fed from a frame feeding station 101 to an assembly station 200 at which a canvas 11 is fed from a canvas feed station 300 to the assembly station 200. In addition, there is a reader station 400 at which a unique identifier 15 that is present on the canvas 11 is read to identify and log the display unit being assembled. Finally, there is an ID application station 500, such as a printing station, at which a final unique identifier can be placed on the assembled display unit to uniquely identity the finished product and allow for subsequent tracking of the product.

In the illustrated embodiment, the system 100 includes a support surface 105 that can be in the form of a bed or table or the like. The support surface 105 is supported by a plurality of legs 107 that serve to elevate the support surface 105 from a ground surface.

Frame Feeding Station

The frame feeding station 101 is designed to hold a supply of assembled frames 13. As mentioned above, these assembled frames 13 comprises "unadorned display unit" and "virgin display unit" in that they only comprise the frame part without the canvas 11. As described herein, the assembled frame 13 comprises a first part (front frame member) and a second part (rear panel) that are detachably assembled together without the presence of the canvas 11.

The assembled frames 13 can be arranged in one or more stacks in one embodiment.

In addition, the frame feeding station 101 includes an automated, controllable mechanism for feeding the assembled frames 13 to the assembly station 200. As illustrated, the mechanism can be in the form of a plurality of movable dividers 110 that are spaced apart to allow for reception of the stacked assembled frames 13 between two adjacent dividers 110. As shown, the dividers 110 are vertical walls (fins) that have sufficient height to allow for stacking of a desired number of assembled frames 13. The dividers 110 thus add stability and support for the stacked assembled frames 13. In the illustrated embodiment, the plurality of dividers 110 are operatively coupled to a continuous belt 112 that is driven along a track. For example, the continuous belt 112 can be a chain that is driven along two rotatable wheels 114 that are spaced apart. Much like a bicycle, the rotation of the wheels 114 causes movement of the chain and since the dividers 110 are coupled to the chain, the movement of the chain results in the dividers 110 being driven along the track. In the illustrated embodiment, the dividers 110, which act like paddles, primarily travel along a first side of the mechanism and an opposite second site and travel only a short time at the ends of the mechanism where the wheels 114 are located. The mechanism can be driven by a controllable motor that allows the speed of the mechanism to be controlled.

It will also be understood that the illustrated mechanism is designed so that one stack of assembled frames 13 is operated one at one time in that the feed mechanism does not continuously operate. This allows empty slots to be restocked with stacked assembled frames 13. Once an entire stack of assembled frames 13 has been operated on, the feed mechanism then advances the next stack to the load position.

In addition, the frame feeding station 101 includes a pusher 120 that serves to move the assembled frame 13 that is next to be operated on to the assembly station 200. The pusher 120 can be a linear pusher that moves between a retracted position that receives the assembled frame 13 and an extended position in which the assembled frame 13 is moved into the assembly station 200. The pusher 120 moves linearly across the bed 105. The pusher 120 has a leading edge 122 that contacts and drives the assembled frame 13 to a target loading location in the assembly station 200. One assembled frame 13 is fed in front of the leading edge 122 and then the pusher 120 advances to the extended position, whereby the assembled frame 13 is placed in the target location in the assembly station 200.

It will also be understood that there can be a second pusher or mover configured to move the bottommost assembled frame 13 from the stack to a location in front the leading edge 122 to then allow the pusher 120 to operate and move the assembled frame 13 to the target location in the assembly station 200.

It will be appreciated that this movable divider-based feed mechanism can be eliminated and the assembled frames 13 can be advanced in another automated manner or even manually fed to the assembly station.

As shown, the frame feeding station 101 can be a standalone unit that can even be mobile due to the presence of wheels on its legs.

Assembly Station 200

The assembly station is configured to receive both one canvas 11 and one assembled frame 13 and then manipulate these parts to cause the stretching of the canvas 11 over the assembled frame 13 and the capture and retention of the canvas 11 within the frame 13 as described herein. It is thus at the assembly station 200 that the final assembly of the display unit occurs.

As shown the assembly station 200 can technically be a standalone unit or it can be integrated with the other stations. The assembly station 200 can be in the form of a table 202 or other support surface in which the target (assembly) location is located which is the location on the support surface at which the canvas 11 and the assembled frame 13 are brought together.

It will be appreciated that the below described characteristics of the support surface and the target location are merely exemplary in nature and not limiting since there are a number of different ways to combine these parts together in the manner described herein.

When the support surface is in the form of a flat table, the target assembly location can comprise a recessed portion (pocket) 210 defined along the top of the flat table. The recessed portion 210 is sized in view of the size of the assembled frames 13. Since the assembled frames 13 can come in different sizes, the recessed portion 210 likewise will vary depending upon the size of the assembled frame 13. As a result, the mobility and standalone aspect of the assembly station 200 relative to the other stations allows for one assembly station 200 having a first sized recessed portion 210 to be swapped out for a different assembly station 200 having a second sized recessed portion 210 different than the first sized recessed portion 210.

Due to the complementary nature of the assembled frame 13 and the recessed portion 210, the illustrated recessed portion 210 has a rectangular shape to snugly receive the rectangular shaped assembled frame 13.

The recessed portion 210 comprises a well that has a depth that is selected in view of the size and dimensions of the assembled frame 13 such that at least a substantial portion of the assembled frame 13 lies within the recessed portion 210. A floor on the recessed portion 210 can have patterned (non-smooth) construction and appearance. The recessed portion 210 is defined by pair of a pair of end walls and a pair of side walls.

The assembly station 200 includes a pair of retractable/extendable locating pins 220 that are located relative to and spaced from the two opposing side walls of the recessed portion 210. The pins 220 are contained within openings in the tabletop and are operatively coupled to an actuator that that causes the pins 220 to move between retracted positions in which the pins 220 are fully contained in the opening and do not protrude above the tabletop and extended positions in which the pins 220 protrude upwardly from the openings and lie above the tabletop. The pins 220 are configured to be received within the pair of locating notches 17 that are formed opposite one another along the two side edges of the canvas 11. When received within the locating notches 17, the pins 220 serve to locate and maintain the canvas 11 in its desired position which is over the recessed portion 210.

The assembly station includes actuatable side guide fingers 230 that are located around the recessed portion 210. In the illustrated embodiment, there are six side guide fingers 230 arranged around the recessed portion 210 and more particularly, there are two side guide fingers 230 located along one side of the recessed portion 210 and two other side guide fingers 230 arranged along the other side of the recessed portion 210, one side guide finger 230 is located at one end of the recessed portion 210 and the last side guide finger 230 is located at the other end of the recessed portion 210.

As shown, each of the side guide finger 230 can be in the form of a flat metal part that pivot at one end relative to the bed (about a pivot point define by a pivot pin). Each side guide finger 230 is pivots between a fully retracted position and a fully extended position. In addition, as described herein, there can be an intermediate position as well which can be considered to be a partially extended position. In the fully retracted position, each side guide finger 230 lies generally parallel to the longitudinal axis of the adjacent side/end of the recessed portion 210. The side guide fingers 230 moves in a generally uniform manner in that the side guide fingers 230 all pivot together and in the same direction.

The lengths of the side guide fingers 230 is such that in both the intermediate positions and the fully extended positions, a tip portion of each side guide finger 230 lies over the recessed portion 210. This tip portion serves several different functions, which are described herein, including but not limited to retaining the assembled frame 13 in the recessed portion 210 and folding over the edges of the canvas 11. In the intermediate position, the side guide fingers 230 partially fold the canvas 11 over but also the tip portions thereof are located over only the outer frame part and not the rear panel. This intermediate position, thus allows for separation of the rear panel from the outer frame part as described herein. Conversely, when the side guide fingers 230 are fully extended, the canvas 11 is completely folded over on top of the outer frame part.

The assembly station 200 also includes an actuatable canvas retainer 240 that is configured to temporarily grasp and hold one end of the canvas 11. The actuatable canvas retainer 240 can have an elongated oblong shape and moves between a raised position and a lowered position. In the lowered position, the assembled frame 13 can travel over the lowered canvas retainer 240 and more particularly, the assembled frame 13 can slide across the tabletop and over the lowered actuatable canvas retainer 240. The actuatable canvas retainer 240 is sized and configured such that one end of the canvas 11 can be captured underneath the actuatable canvas retainer 240. The actuatable canvas retainer 240 thus serves to temporarily hold the canvas 11 in place along the tabletop. The actuatable canvas retainer 240 is thus positioned at one end of the recessed portion 210 with one side guide finger 230 located between the retainer 230 and the end of the recessed portion 210. The actuatable canvas retainer 240 is along the end of the recessed portion 210 that is opposite the canvas feed station 300 and thus, as the canvas 11 is fed over the recessed portion 210 one end of the canvas 11 is positioned in the area of the actuatable canvas retainer 240 and in particular, positioned below the actuatable canvas retainer 240 when it is in the raised position.

The assembly station 200 also includes an actuatable presser head 250 that is positioned over the recessed portion 210 and moves in an up and down manner. The presser head 250 thus has a complementary shape relative to the assembled frame 13. In other words, the footprint of the presser head 250 is complementary to the footprint of the assembled frame 13. As described in detail herein, the presser head 250 is configured to perform several different functions including but not limited to: pressing the assembled frame 13 into the recessed portion 210 and temporarily separating the two parts of the assembled frame 13 to allow folding and capture of the canvas 11 and then reassembling the two parts of the assembled frame 13 such that the canvas 11 is captured between the two parts.

The presser head 250 has a main body 252 which in the illustrated embodiment has a rectangular shape. The main body 252 has an underside that faces the tabletop. As shown in the figures, the main body 252 is sized so that it has a footprint (length and width) that is the same or similar to the footprint (length and width) of one part (the rear panel) of the assembled frame 13. Thus, when the main body 252 is lowered and presses the assembled frame 13 downward, the presser head 250 is actually pressing against the rear panel of the assembled frame 13; however, since the rear panel is attached to the frame member of the assembled frame 13, the pressing action against the rear panel drives the entire assembled frame 13 downward into the recessed portion 210.

The up and down movement of the presser head 250 can be achieved using any number of different mechanisms, including a hydraulic mechanism, a pneumatic mechanism, etc.

As mentioned above, one of the functions of the presser head 250 is to separate the two parts of the assembled frame 13. The presser head 250 thus includes a mechanism that achieves this function. Any number of different mechanisms can be used including but not limited to a mechanical based system or an air based section such as the application of negative pressure to one part and then subsequent upward movement of the presser head 250 to cause separation of the two parts.

Figure 28:
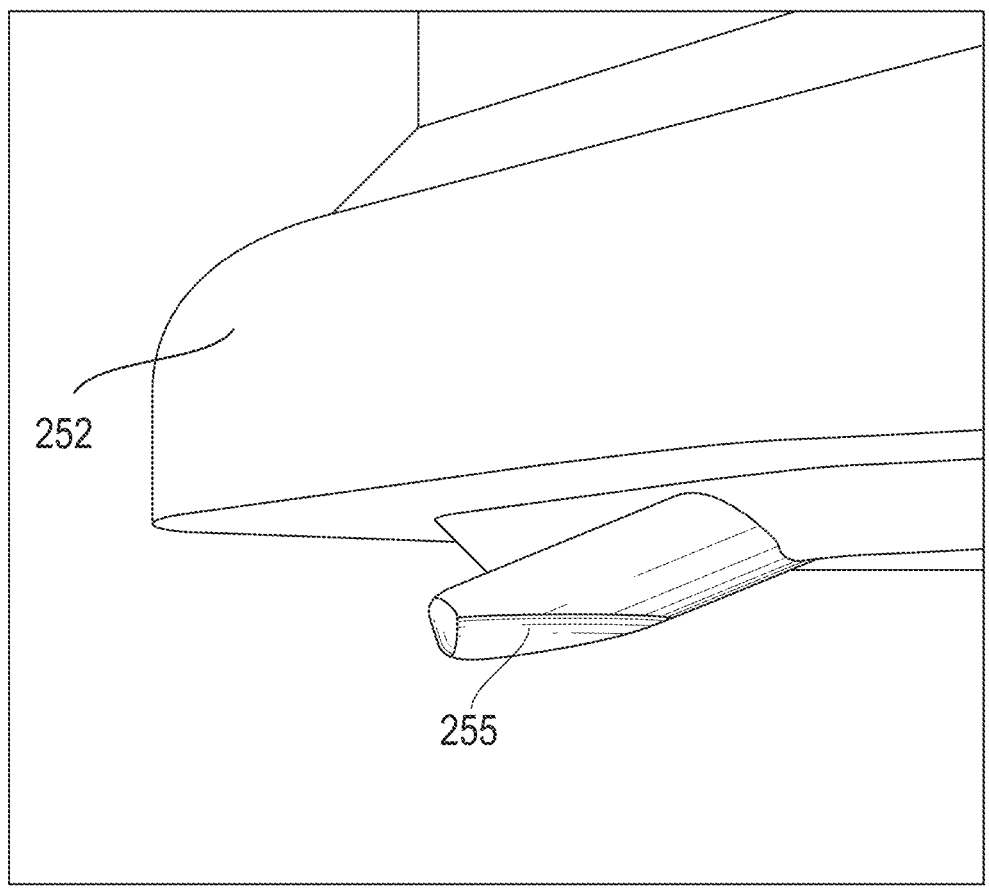
FIG. 28 is a side perspective view of one corner of the presser head showing a retractable pin in an extended position.

In one embodiment, the mechanism is a mechanical mechanism in which gripper pins 255 are extended from the underside of the body 252 of the presser head 250 (See, FIG. 28). There can be two gripper pins 255 located near the two ends of the underside of the presser head. The two gripper pins 255 can be positioned such that when extended, they protrude at an angle from the underside other than at a 90 degree angle. In other words, the extended gripper pins 255 are not perpendicular to the underside of the presser head 250. As shown in the figures, the rear panel includes a plurality of recessed portions located along the two sides and two ends and also includes adjacent notches next to the plurality of recessed portions. When the gripper pins 255 are extended, the tips of the gripper pins 255 travel into the recessed portions of the rear panel and enter the notches and in fact are captured underneath the rear panel. Since the extended gripper pins 255 are captured by the rear panel and when the frame member is fixedly held in the recessed portion 210, the upward movement of the presser head 250 will cause the disengagement of the rear panel from the frame member and is carried by the presser head 250. This separation is required into order to fold and capture the canvas 11 within the assembled frame 13. These movements are described in more detail herein.

As mentioned, instead of using extended gripper pins 255, the presser head 250 can be constructed to include suction ports at which negative pressure is generated to create a suction force that is sufficient to lift the rear panel up from the held outer frame member.

The assembly station 200 also includes a mechanism (device) for tucking the corners of the canvas 11. More specifically, an actuatable tucking mechanism is provided and includes a plurality of slits or slots 260 that are formed in the tabletop. The locations of the slots 260 can vary; however, they are generally in the corner regions of the assembled frame 13 to allow for tucking of the corners of the canvas 11. Each slot 260 has a closed end 262 located away from the recessed portion 210 and an open end 264 that directly communicates with the hollow interior of the recessed portion 210.

The slots 260 contain tuckers that serve, when actuated, to tuck the corners of the canvas 11. In one embodiment, with each slot 260, there are two tucking elements and more particularly, there is a first tucking element 270 and a second tucking element 272. The first tucking element 270 is located within the slot 260 at a location closer to the recessed portion 210, while the second tucking element 272 is located in the slot 260 at a location that is further away from the recessed portion 210. Each of these tucking element 270, 272 can move in a pivoting manner. As described in more detail herein, the second tucking element 272 can serve to center and hold a folded or pleated corner of the canvas 11 in place, while the first tucking element 270 serves to actually drive the folded or pleated corner inward resulting in the inward tucking of the corner of the canvas 11 into the assembled frame 13.

Figure 25:
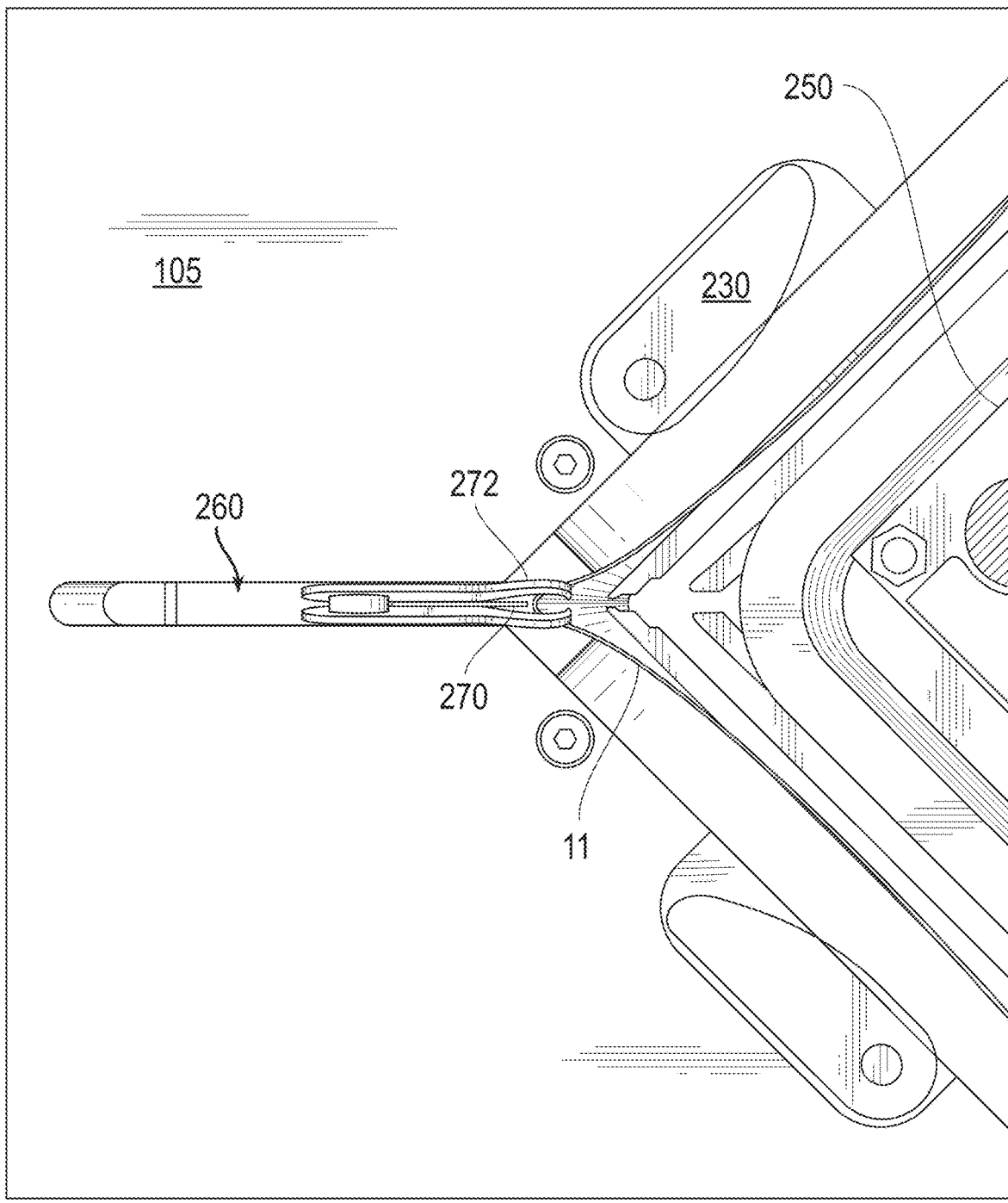
FIG. 25 is a top plan view of one corner of the assembly station showing a pleated corner tucking mechanism with a first tucking element in a retracted position and a second tucking element in an extended position by which it centers and holds a pleated corner of the canvas.
Figure 26:
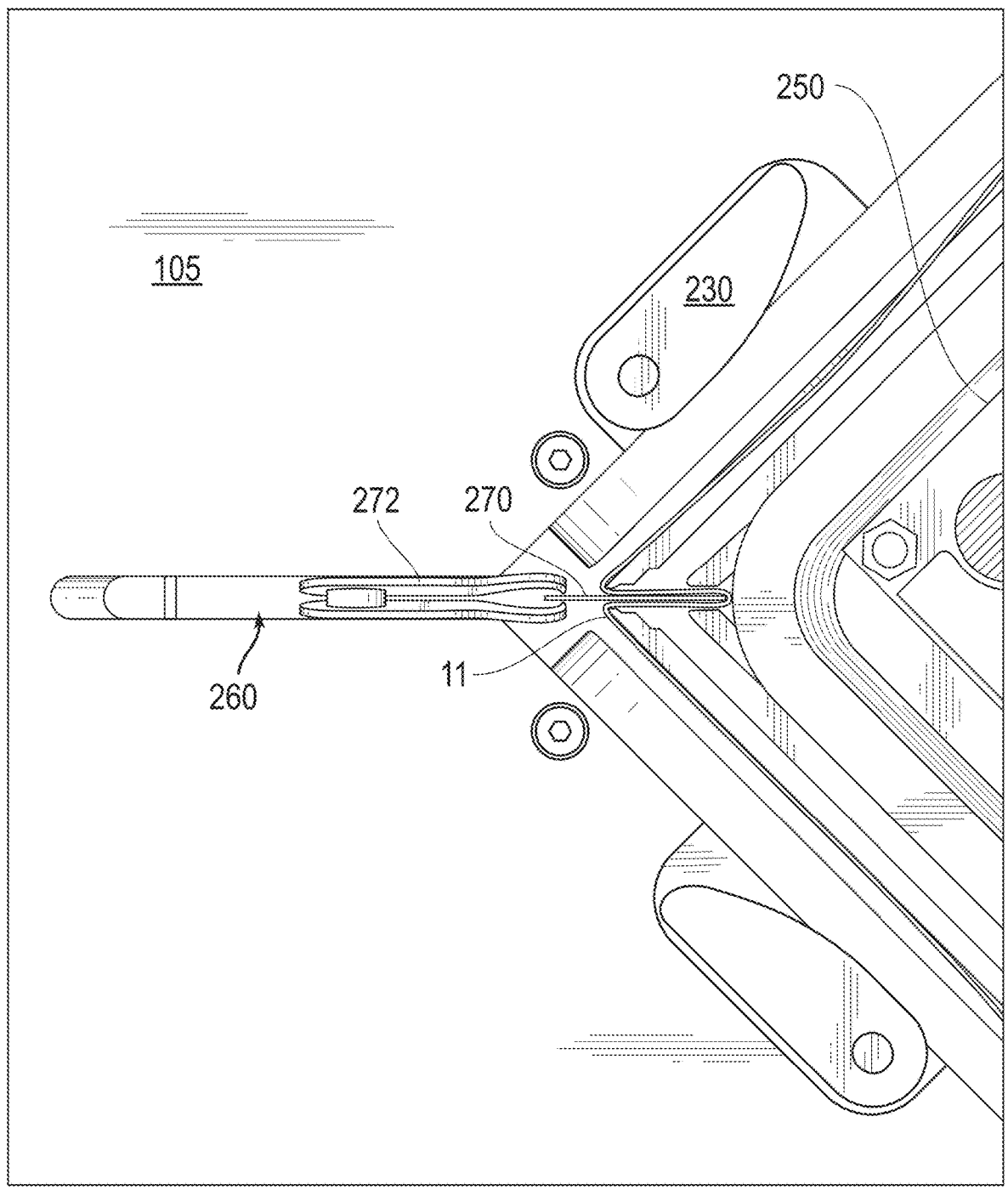
FIG. 26 is a top plan view of the corner of the assembly station showing the first tucking element in an extended position by which the pleated corner is inverted.
Figure 27:
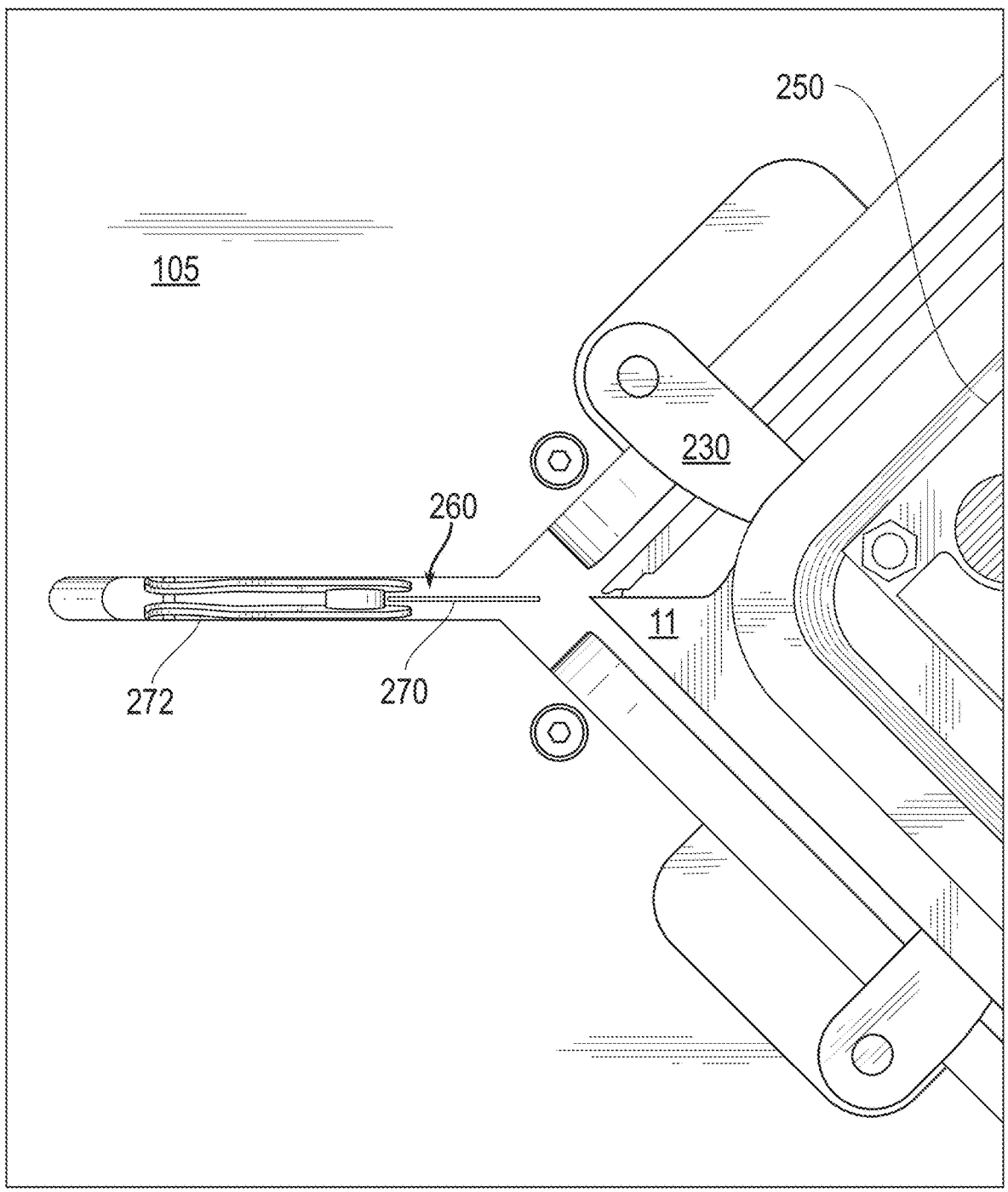
FIG. 27 is a top plan view of the corner of the assembly station showing the first and second tucking elements in retracted positions.

FIG. 25 is a top plan view of one corner of the assembly station showing the first tucking element 270 in a retracted position and a second tucking element 272 in an extended position by which it centers and holds a pleated corner of the canvas 11. FIG. 26 is a top plan view of the corner of the assembly station showing the first tucking element 270 in an extended position by which the pleated corner is inverted. FIG. 27 is a top plan view of the corner of the assembly station showing the first and second tucking elements 270, 272 in retracted positions.

In one embodiment, as illustrated, the pivot points of the first tucking element 270 and the second tucking element 272 are at different locations with the pivot of the first tucking element 270 being more inward and above the pivot of the second tucking element 272. The pivot of the second tucking element 272 is a fixed pivot, while the pivot of the first tucking element 270 is a movable pivot. In an initial retracted position of the first tucking element 270, the first tucking element 270 is in a first position and then, when "fired", the first tucking element 270 pivots (swings) upward and then downward about a first pivot location and passes between the claws of the second tucking element 272 and contacts and drives the pleated corner inward resulting in inversion of the pleated corner. Once the pleated corner of the canvas is inverted, the first tucking element 270 is then returned to the initial retracted position. This movement occurs by means of a moving pivot of the first tucking element 270. In particular, the fired first tucking element 270, that is at least partially within the corner slot of the frame, first moves rearward in an axial direction within the slot resulting in the pivot of the first tucking element 270 moving outwardly in the slot 260 and then once the first tucking element 270 is free of the inverted pleated corner, the first tucking element 270 pivots (swings) upward toward the outer end of the slot 260 and then downward toward the slot 260 and the retracted second tucking element 272. Since the pivot of the first tucking element 270 can be above the pivot of the second tucking element 272, the retracted first tucking element 270 is positioned at least partially above the retracted second tucking element 272.

Accordingly, in one embodiment, in the initial at rest positions, the first and second tucking elements 270, 272 are fully contained within the slots 260 below the top surface of the tabletop and thus, the canvas 11 and assembled frame 13 can travel right over these elements 270, 272.

Both the first tucking element 270 and the second tucking element 272 can be in the form of a flat metal fingers with contoured tip portions at least for the second tucking element 272. As shown, the second tucking element 272 can be formed of two spaced apart fingers that are parallel to one another and have at their distal ends a hook or claw like structure. The second tucking element 272 is designed to pivot from an at rest position to an extend position. In the at rest position, the distal end (claw structure) is located in the slot 260 at a location proxime the closed end 262 of the slot 260. The open section of the claw structure is facing upward in this position. In the extended position, the second tucking element 272 has pivoted and the claw structure at the distal end contacts the pleated corner of the canvas.

The space between the two fingers of the second tucking element 272 is sized to accommodate at least an end or section of the first tucking element 270 since when the second tucking element 272 pivots from the at rest position to the extended position, the second tucking element 272 flips over the first tucking element 270 (the first tucking element 270 is contained within the second tucking element 272 however as described herein the first tucking element 270 can still pivot into contact with the canvas 11 without contacting the second tucking element 272). The placement of the pivot of the first tucking element 270 above and laterally offset from the pivot of the second tucking element 272 allows for such unobstructed pivot of both elements 270, 272.

The second tucking element 272 is configured to be received within a center opening of the folded (pleated) corner of the canvas 11. Reception of the second tucking element 272 within this opening not only centers the canvas corner relative to the corner of the assembled frame 13 but also provides body to the folded canvas which serves to assist the first tucking element 270 which once again is the actual tool that contracts (strikes) the folded (pleated) corner. The claw structure at the distal end of the second tucking element 272 thus is draped over the top edge of the pleated canvas corner and serves to hold open the pleated corner and maintain it centered in an upright position.

In fact, the first tucking element 270 contacts the canvas that is draped over the second tucking element 272 and thus, the first tucking element 270 can make striking contact with the second tucking element 272 and auditory feedback can be provided (noise of this striking action).

As described herein, the actuatable first and second tucking elements 270, 272 are operatively connected to the master controller such that the operations of these elements 270, 272 follows a scripted routine. For example, the second tucking element 272 is advanced into the folded (pleated) corner of the canvas 11 for centering thereof and then the first tucking element 270 can be successively "fired" to contact and enter the pleated corners to invert the fold to finish the canvas 11. To be safe, this action can be repeated to ensure that the fold is fully inverted. In other words, the controller can be configured to fire the first tucking element 270 in succession and in particular, the first tucking element 270 can be twice fired in succession.

Canvas Feed Station 300

The canvas feed station 300 is configured to controllably advance one select canvas 11 to the target location of the assembly station. Each canvas 11 has a front face on which the image is located and an opposite rear face.

Similar to the manner in which the assembled frames 13 are fed to the assembly station 200, the canvases 11 can be initially supplied as a stack. The canvases 11 are stacked in a uniform manner such as with the front faces all facing down. In the illustrated system 100, the canvas feed station 300 is a dedicated station that has its own platform (bed) 302 on which the stack of canvases 11 are placed. As shown, the canvas feed station 300 can be a standalone unit that can even be mobile due to the presence of wheels on its legs.

The platform 302 can be of a movable type and in particular can be of a type that moves between a lowered position and a raised position. When there is a full stack of canvases 11, the platform 302 is lowered. The platform 302 can be spring biased or have another mechanism that allows the automatic raising of the platform 302 as more and more canvases 11 are removed successively from the stack. This ensures that the top canvas 11 is located in generally the same location which can be considered to be a canvas feed location at which the canvasses are lifted and transferred. The top canvas 11 is the one which is transferred to the assembly station 200 for mating with one assembled frame 13.

A transfer device 310 is provided at the canvas feed station 300 for controllably transferring the canvas 11 from the canvas feed station 300 to the assembly station 200. The transfer device 310 is of a type that can move the canvas 11 between the stations. For example, the transfer device 310 can be a gripper or a pneumatic device in which suction is used to controllably carry the canvas 11 between the stations.

The transfer device 310 can be of a type that moves along a guide track 320. The guide track 320 can have a linear construction with one end located over the canvas feed station 300 and the opposite end located over the assembly station 200. This allows the transfer device 310 to move between the two stations.

The transfer device 310 also has a carriage 330 that is configured to controllably move along the guide track 320. The carriage 330 includes a base 332 suspended along the guide track 320, rails 321 and a plurality of grippers 340 that comprise fingers (that extend downward from the rails 321) with flexible suction cups 342 at their ends. The suction cups 342 are in fluid communication with a suction source to provide suction to the insides of the suction cups 342. Along each suction cup there are one or more suction ports to create a suction force at the suction cup underside that is placed into contact with the canvas. In the illustrated embodiment, there are four grippers 340 that are spaced apart from one another and in particular, two grippers 340 can be located along one side and two grippers 340 can be located along another opposite side. The four grippers 340 thus define four corners of a square and are spaced apart and positioned relative to one another such that they contact inner areas of the rear face of the canvas 11. All of the suction cups 342 lie in the same plane.

The applied suction force can be turned on and off in a controlled manner.

It will also be appreciated that the carriage 330 moves not only linearly but also moves in an up and down manner to allow the carriage 330 to pick up and then discharge the canvas. More specifically, the carriage 330 is first positioned at one end of the guide track 320 over the stack of canvases and then the carriage 330 moves down such that the suction cups 342 contact the topmost canvas 11. The applied suction force is on which results in the canvas being held by the suction cups. The carriage 330 then moves upward such that the canvas is lifted up and then the carriage 330 moves linearly along the guide track 320. Once the carriage 330 reaches the other end of the guide track above the target location in the assembly station 200. Then the carriage 330 moves downward until the canvas 11 is contacts or is close to contact with the bed at the target location. The applied suction force is removed resulting in the canvas dropping onto the bed and remaining at the target location.

The carriage 330 is then moved upward and then is moved back the other end of the guide track 320 to repeat the process and at the appropriate time pick up and deliver the next canvas 11 to the target location at the assembly station 200.

As shown, the canvas 11 is laid flat on the bed at the target location.

It will be appreciated that the transfer device is not limited to being a pneumatic device but can be a mechanical device that grips and holds and carries the canvas 11 between the stations.

It will be appreciated that each canvas 11 can have a unique identifier 15 associated therefore for the purpose of uniquely identifying each canvas 11. For example, the unique identifier 15 can be in the form of a readable mark, such as a printed identifier, such as a printed bar code or QR code. As shown, the unique identifier 15 can be located along an edge along the front face that is ultimately folded and not visible in the fully assembled framed unit 10. The location of the unique identifier 15 is outside of the image area of the front face.

In addition, the canvas 11 includes a pair of locating notches 17 that are formed opposite one another along two side edges of the canvas 11.

Reader Station 400

The reader station 400 is intended to read the unique identifier 15 that is located on the canvas 11. Any number of suitable types of readers can be provided so long as they are configured to read the unique identifier 15 on the canvas 11. For example, the reader can be a bar code reader or QR reader or other type of optical reader that can read an optical mark that is associated with the canvas 11.

The reader is operatively connected to a computing device that includes a processor and memory and is configured to execute software. The reader thus reads the unique identifier 15 and can log it into a database with information such as the time and location of identification.

The reader station 400 is located to one side of the target location of the assembly station and faces the target location.

As described herein, each of the stations can be operatively connected to a master controller that allows for the various devices at the stations to operate and also allows for feedback to be received. In this way, the devices at the different stations can operate in a synchronized manner and the master controller monitors and controls the operating status of each of the devices.

Framed Article Transporter

Once the framed article is assembled and complete, a framed article transporter 450 removes the framed article from the assembly station 200. The framed article transporter 450 includes a gripper device 452 that moves axially along a guide track 454. The gripper device 452 moves between an at rest position in which the gripper device 452 is located outside the assembly station 200 and an extended position in which the gripper device 452 moved into the assembly station 200 for engaging the complete framed article to allow the complete framed article to be removed from the assembly station 200. In other words, the gripper device 452 can move back to the at rest position while holding the complete framed article.

In one method of operation, the presser head 250 lifts the complete framed article (due to gripper pins 255 engaging the complete framed article) to allow at least a portion of the gripper device 452 to move below presser head 250 and the framed article. The gripper device 452 can have a pair of legs 455 that are spaced apart and parallel to one another such that the gripper device 452 can have a U-shape. At least a portion of the legs 455 can be located below the presser head 250 and complete framed article. The presser head 250 lowers the complete framed article onto the legs 455 and then disengages from the framed article as by retraction of the gripper pins 255. This results in the complete framed article falling a short distance onto the legs 455. The gripper device 452 then moves away from the assembly station 200 carrying the complete framed article.

Unique Code Application Station

The system 100 can include a station 490 at which a final unique identifier can be applied to the completed framed article. In the completed framed article, the unique identifier 15 (e.g., barcode) is hidden and cannot be read and thus, in order to track the completed framed article, another unique identifier needs to be applied. The station 490 can be at the rest position of the gripper device 452 or can be another station that can be accessed by the gripper device 452.

At the station 490, the unique identifier is applied to the completed framed article. For example, the unique identifier can be in the form of a unique QR code that is printed to the back of the canvas and be matched to the now hidden unique identifier 15 (barcode). In one embodiment, the QR code can be printed using invisible ink that can be only read by a special device that is able to detect and read such QR code.

The system 100 can have a database stored in memory in which the initial order information, the unique identifier 15 and the unique QR code are stored together to uniquely identify and allow future tracking of this order.

Method of Assembly

According to one exemplary embodiment, the framed article can be assembled in the following manner.

First, a user interface, such as a touch screen or a control pad with one or more buttons, is used by the user to begin the assembly process. For example, a start button can be pressed by the user.

The system 100 is part of a computer implemented system in that the system executed and runs software. The system 100 is designed to receive and store a number of framed article orders that can be uploaded by a customer on a website platform or kiosk at a store or the like. The user not only uploads a file, such as a jpeg file, as well as the size of the framed article and also provides user identification information such as the name and address of the user, etc. These orders from many different customers can be queued in memory of the control unit of the system 100. Once the system 100 is turned on and operated, the queued orders are then accessed by worked on by the system. For example, the queued orders can be worked on in chronological order or by another type of sorting, such as by size, etc.

The following steps describe one exemplary workflow for preparing one frame article; however, it will be appreciated that there are other ways to assemble the framed article and one or more steps can be modified and/or eliminated in certain applications.

In a first step, the canvas is delivered from the canvas feed station 300. For example, the transfer device 310 can be retrieve and deliver one virgin (stock) canvas 11 to the assembly station 200. The carriage 330 is first positioned at one end of the guide track 320 over the stack of canvases and then the carriage 330 moves down such that the suction cups 342 contact the topmost canvas 11. The applied suction force is on which results in the canvas being held by the suction cups. The carriage 330 then moves upward such that the canvas is lifted up and then the carriage 330 moves linearly along the guide track 320. Once the carriage 330 reaches the other end of the guide track above the target location in the assembly station 200. Then the carriage 330 moves downward until the canvas 11 is applied over the recessed portion 210. The applied suction force is removed resulting in the canvas dropping onto the bed above the recessed portion 210. The canvas 11 has a dimensions greater than the recessed portion 210 and therefore the peripheral areas of the canvas lie on the bed itself surrounding the recessed portion 210. The canvas retainer 240 is operated and holds one edge of the canvas 11 so that the canvas 11 cannot be accidentally moved along the bed surface.

In a second step, the assembled frame 13 is delivered from the frame feeding station 101 to the assembly station 200. For example, one assembled frame 13 is positioned in front of the pusher 120 can then the pusher 120 is operated to push the assembled frame 13 to the assembly station 200. The assembled frame 13 is pushed across the canvas 11 that is being held on the bed. The assembled frame 13 is positioned on top of the canvas 11 above the recessed portion 210.

In a third step, the presser head 250 is driven to a location that is above the assembled frame 13 and thus above the one assembled frame 13. The presser head 250 is driven down and contacts the top of the one assembled frame 13. The presser head 250 drives the one assembled frame 13 downward so as to push the one assembled frame 13 into the recessed portion (pocket) 210. Since the canvas 11 is larger than the one assembled frame 13, the canvas 11 extends beyond all of the edges of the one assembled frame 13. When the one assembled frame 13 is pushed into the recessed portion 210, the side flaps (sides) of the canvas 11 are raised up as shown. The raised side flaps are thus located between the one assembled frame 13 and the side walls of the recessed portion 210. In this position, the unique identifier 15 formed (printed) along the canvas is visible. For example, as mentioned, the unique identifier 15 is located along one side of the canvas 11 and when this respective side of the canvas 11 is raised up, the unique identifier 15 becomes visible and is located outside (above) the recessed portion 210 and faces outward toward the reader station 400.

In a fourth step, the reader (e.g., barcode reader) at the reader station 400 reads the unique identifier 15. This step thus associates the processed order with one canvas 11 with the unique identifier 15. In other words, the processed order is assigned and linked to the unique identifier 15 so that the order can be easily tracked.

In a fifth step, the side guide fingers 230 pivot inward and contact and push downward the upright (raised) sides of the canvas 11. This results in the sides of the canvas 11 lie generally flat over the side edges of the one assembled frame 13. In addition, since the side guide fingers 230 also lie over the side edges of the one assembled frame 13, the side guide fingers 230 also retain the frame member 1320 within the recessed portion (pocket) 210. However, the side guide fingers 230 do not engage and contact the rear panel 1330 and thus, the rear panel 1330 can be separated from the frame member 1320 by the upward movement of the presser head 250 while the frame member 1320 is held in the recessed portion.

In a sixth step, the rear panel 1330 is separated from the frame member 1320 by the presser head 250. More particularly, the presser head 250 is driven downward into contact with the rear panel 1330. The presser head 250 is then engaged to the rear panel 1330 as by extending the gripper pins 255. As mentioned, these gripper pins 255 enter complementary spaces of the rear panel 1330 so as to couple the presser head 250 to the rear panel 1330. Once coupled, the presser head 250 is raised up causing separation of the rear panel 1330 from the frame member 1320.

When the rear panel 1330 is raised, the side flaps of the canvas 11 lie generally flat across the frame member 1320 that is retained in the recessed portion 210. The side guide fingers 230 thus prepare the canvas 11 for the pressing head 250 (with the captured rear panel 1330) to come back down.

In a seventh step, the presser head 250 with the captured rear panel 1330 is pressed down into contact with the side flaps of the canvas 11 and engages and attaches to the frame member 1320. As mentioned herein, the rear panel 1330 and the frame member 1320 can engage one another by a snap-fit arrangement. It will be appreciated that when the rear panel 1330 snap-fittingly attaches to the frame member 1320, the canvas 11 is captured therebetween and is tensioned so that the canvas 11 is taut across the assembled frame. At this time, the corners of the canvas 11 remain unprocessed and can be characterized as being pleated corners that are untucked.

In an eighth step, the untucked pleated corners are processed and more particularly the pleated corners are inverted to finish the frame article. As described herein, the second tucking element 272 pivots and the distal claw-like structure is draped over the top edge of the pleated corner. As mentioned, the second tucking element 272 centers the pleated corner and permits the first tucking element 270 to strike the pleated corner and invert the fold to finish the canvas 11. As mentioned, the first tucking element 270 can repeatedly contact and push in the pleated corner to complete the corner. It will be understood that the order of the fifth step 540 and the eighth step 570 can be reversed in that the untucked pleated corners can first be inverted and tucked into the frame corner and then subsequently, the side guide fingers 230 pivot inward and contact and push downward the upright (raised) sides of the canvas 11.

In a ninth step, the complete frame article is removed from the assembly station 200 and delivered to another station. For example, the presser head 250 can lift the complete framed article (due to gripper pins 255 engaging the complete framed article) to allow at least a portion of the gripper device 452 to move below presser head 250 and the framed article. At least a portion of the legs 455 can be located below the presser head 250 and complete framed article. The presser head 250 lowers the complete framed article onto the legs 455 and then disengages from the framed article as by retraction of the gripper pins 255. This results in the complete framed article falling a short distance onto the legs 455. The gripper device 452 then moves away from the assembly station 200 carrying the complete framed article away from the assembly station.

In a tenth step, the complete framed article is delivered to the station 490 at which the unique code (e.g., unique QR code) is applied to the rear of the framed article (e.g., to the back of the canvas).

It is to be understood that like numerals in the drawings represent like elements through the several figures, and that not all components and/or steps described and illustrated with reference to the figures are required for all embodiments or arrangements.

Thus, illustrative embodiments and arrangements of the present devices and methods provide a method for applying a hair fastener. The flowchart in the figures illustrates the operation of possible implementations of methods according to various embodiments and arrangements. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. An automated system for assembling a framed article comprising:
    a plurality of canvases;
    a plurality of assembled frames to be combined with the plurality of canvases to form the framed articles, each assembled frame being formed of one rear panel and one frame member that are detachably attached to one another with one canvas being stretched across a front face of one respective frame member; and
    an assembly station including a movable presser head that is configured to detach and lift one rear panel from one respective frame member that defines, in combination with the one rear panel, one assembled frame and a plurality of movable side guide fingers that are configured to fold side edges of the canvas over sides of the one frame member to permit the presser head to press the one rear panel down over the folded side edges of the canvas into engagement with the one frame member with the canvas being captured between the one frame member and the one rear panel.

2. The automated system of claim 1, wherein the assembly station includes a bed having a recessed pocket formed therein, the recessed pocket being configured to receive the canvas and the one assembled frame, the bed further including a four linear slots formed therein and being located in and being open in corners of the recessed pocket.

3. The automated system of claim 2, further including a corner tucking mechanism that is configured to tuck in and invert pleated corners of the canvas, the corner tucking mechanism comprising four corner tucking devices that are located in the four linear slots, each of the four corner tucking devices being operable to tuck in and invert one of the pleated corners of the canvas.

4. The automated system of claim 3, wherein each of the four corner tucking devices comprises a first tucking element and a second tucking element, the first tucking element being located proximate the open end of the linear slot, while the second tucking element being located proximate a closed end of the linear slot.

5. The automated system of claim 4, wherein the second tucking element comprises a pair of spaced fingers with an open space therebetween, the second tucking element pivoting between a first position in which hooked shaped distal ends of the pair of spaced fingers are located closer to the closed end of the linear slot and a second position in which the hooked shaped distal ends are located closer to the open end of the linear slot.

6. The automated system of claim 5, wherein in the first position, the hooked shaped distal ends are facing upward and in the second position, the hooked shaped distal ends are facing downward.

7. The automated system of claim 5, wherein the first tucking element is disposed within the open space between the pair of spaced fingers and moves between a retracted position and a pivoted extended position in which the first tucking element drives and inverts the pleated corner of the canvas.

8. The automated system of claim 1, wherein the plurality of canvases are stored in a stack at a canvas feed station spaced from the assembly station.

9. The automated system of claim 8, wherein the canvas feed station includes a transfer device that is configured to retrieve one canvas from the stacked plurality of canvases and deliver the one canvas to a target location of the assembly station.

10. The automated system of claim 9, wherein the transfer device has a carriage that rides along a guide track between the canvas feed station and the assembly station, the carriage having a plurality of grippers for selectively gripping and transporting the one canvas.

11. The automated system of claim 10, wherein each gripper includes a suction cup that has one or more suction ports that are operatively connected to a source of negative pressure for generating suction at the suction cup to allow the suctions cups to hold the one canvas by suction when the negative pressure is applied to the suction cups.

12. The automated system of claim 1, further including a reader station spaced from and facing the assembly station, the reader station including a reader that reads a first unique identifier that is located along the canvas.

13. The automated system of claim 12, further including an ID application station at which a second unique identifier is placed on the assembled framed article.

14. The automated system of claim 13, wherein the second unique identifier comprises a QR code printed on a rear of the canvas with invisible ink.

15. The automated system of claim 12, wherein the first unique identifier comprises a barcode printed along one edge of the canvas.

16. The automated system of claim 1, further including a frame feeding station at which the plurality of assembled frames are contained in one or more stacks.

17. The automated system of claim 16, wherein the frame feeding station includes a transporter that delivers one assembled frame to a target location at which a pusher is located and configured to advance the one assembled frame to the assembly station.

18. The automated system of claim 17, wherein the transporter comprises a plurality of divider walls that define slots for receiving stacks of the assembled frames, the plurality of divider walls being movable along a guide track.

19. The automated system of claim 1, wherein the assembly station includes a bed having a recessed pocket formed therein, the recessed pocket being configured to receive the canvas and the one assembled frame.

20. The automated system of claim 19, wherein the plurality of movable side guide fingers are disposed about the recessed pocket and in pivoted positions, distal ends of the movable side guide fingers are located over the recessed pocket.

21. The automated system of claim 1, wherein the presser head includes a main body and is configured to move in an up and down direction, the main body having a plurality of gripper pins each of which moves between a retracted position and an extended position, wherein in the extended positions, the gripper pins are received in spaces formed in the rear panel, thereby allowing the presser head to lift up the rear panel.

22. The automated system of claim 21, wherein the plurality of gripper pins comprises two gripper pins located at opposite ends of the main body.

23. The automated system of claim 1, wherein each assembled frame includes a frame member and a rear panel that snap-fittingly attaches to the frame member in a detachable manner.

24. The automated system of claim 1, wherein opposing edges of the canvas have notches and the assembly station includes locating pins that moves between retracted positions and extended positions in which the locating pins are received in the notches of the canvas.

25. The automated system of claim 1, wherein the plurality of canvases are contained in a stack on a spring biased platform that is configured to position a top most canvas in the stack at a transfer location at which a canvas transfer device can pick up and move the top most canvas to the assembly station.

26. An automated system for assembling a framed article comprising:
- a bed having a flat working surface;
- canvases arranged in a stack;
- a movable carriage configured to pick up a top canvas from the stack of canvases and move the top canvas to an assembly station that includes a recessed portion formed in the flat working surface of the bed, wherein the movable carriage positions the top canvas over the recessed portion;
- a plurality of assembled frames to be combined with the plurality of canvases to form the framed articles, each assembled frame being formed of one rear panel and one respective frame member that are detachably attached to one another with one canvas being stretched across a front face of the one frame member; and
- an axially movable presser head located above the recessed portion at the assembly station and being configured to: 1) press one assembled frame into the recessed portion, whereby the top canvas is pressed also into the recessed portion below the assembled frame; 2) separate the one rear panel from the one frame member that is pressed into the recessed portion to allow the top canvas to be folded over edges of the one frame member; and 3) reattach the one rear panel to the one frame member once the top canvas is folded over the one frame member resulting in the top canvas being captured between the one rear panel and the one frame member.

27. An automated system for assembling a framed article comprising:
- a bed having a flat top surface and a recessed portion formed in the flat top surface;
- a plurality of canvases;
- a plurality of assembled frames to be combined with the plurality of canvases to form the framed articles, each assembled frame being formed of one rear panel and one frame member that are detachably attached to one another with one canvas being stretched across a front face of the one frame member and captured between the one rear panel and the one frame member; and
- an assembly station for combining the one canvas with the one assembled frame, the assembly station including an axially movable presser head that is configured to position one assembled frame on top of one canvas that is positioned at the assembly station; and
- a corner tucking mechanism that is configured to tuck in and invert pleated corners of the canvas, the corner tucking mechanism comprising four corner tucking devices that are located in four linear slots that are at corners of the recessed portion of the bed, each of the four corner tucking devices being operable to tuck in and invert one of the pleated corners of the canvas to allow the one pleated corner to be tucked into a corner slot of the assembled frame.

* * * * *